(12) United States Patent
Jactat et al.

(10) Patent No.: US 11,943,789 B2
(45) Date of Patent: *Mar. 26, 2024

(54) COMMUNICATION SYSTEM

(71) Applicant: NEC Corporation, Tokyo (JP)

(72) Inventors: Caroline Jactat, Kawasaki (JP);
Sadafuku Hayashi, Tokyo (JP);
Jonathan Lewis, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/389,964

(22) Filed: Jul. 30, 2021

(65) Prior Publication Data
US 2021/0360588 A1 Nov. 18, 2021

Related U.S. Application Data

(63) Continuation of application No. 13/883,754, filed as application No. PCT/JP2011/076123 on Nov. 7, 2011, now Pat. No. 11,096,148.

(30) Foreign Application Priority Data

Nov. 8, 2010 (GB) ...................................... 1018855

(51) Int. Cl.
H04H 20/71 (2008.01)
H04L 12/18 (2006.01)
(Continued)

(52) U.S. Cl.
CPC ........... *H04W 72/30* (2023.01); *H04L 12/189* (2013.01); *H04L 51/58* (2022.05); *H04W 4/06* (2013.01); *H04W 76/40* (2018.02); *H04W 4/21* (2018.02)

(58) Field of Classification Search
CPC ... H04W 72/005; H04W 76/10; H04W 48/12; H04W 72/30; H04W 4/06; H04W 76/40;
(Continued)

(56) References Cited

U.S. PATENT DOCUMENTS

2004/0147266 A1* 7/2004 Hwang ............... H04W 72/005
455/445
2004/0229626 A1 11/2004 Yi et al.
(Continued)

FOREIGN PATENT DOCUMENTS

CN 1536795 A 10/2004
CN 101064622 A 10/2007
(Continued)

OTHER PUBLICATIONS

3GPP TS 36.331 V9.2.0 (Mar. 2010) (Year: 2010).*
(Continued)

Primary Examiner — Sithu Ko
Assistant Examiner — Vanneilian Lalchinthang

(57) ABSTRACT

A communication system is described in which an MBMS service is provided by unicast or broadcast/multicast communication in dependence on whether the number of mobile communication devices indicating an interest in receiving the service is below or above a broadcast threshold. An improved procedure for counting the number of mobile communication devices interested in receiving the MBMS service is also disclosed.

16 Claims, 23 Drawing Sheets

(51) Int. Cl.
*H04L 51/58* (2022.01)
*H04M 1/66* (2006.01)
*H04Q 1/20* (2006.01)
*H04W 4/06* (2009.01)
*H04W 72/30* (2023.01)
*H04W 76/40* (2018.01)
*H04W 4/21* (2018.01)

(58) Field of Classification Search
CPC ..... H04W 4/21; H04W 72/23; H04W 12/062; H04W 12/06; H04L 12/18; H04L 12/189; H04L 51/38; H04L 51/58; H04L 67/14
USPC ........................................................ 370/312
See application file for complete search history.

(56) References Cited

U.S. PATENT DOCUMENTS

| | | | |
|---|---|---|---|
| 2005/0041610 A1 | 2/2005 | Lee et al. | |
| 2005/0083913 A1* | 4/2005 | Choi | H04W 76/40 370/352 |
| 2005/0192021 A1* | 9/2005 | Lee | H04W 76/15 455/452.2 |
| 2005/0213583 A1* | 9/2005 | Lee | H04W 72/1289 370/395.5 |
| 2005/0281209 A1 | 12/2005 | Cai et al. | |
| 2006/0244924 A1 | 11/2006 | Wood | |
| 2006/0252439 A1 | 11/2006 | Cai | |
| 2008/0043658 A1 | 2/2008 | Worrall | |
| 2008/0261581 A1 | 10/2008 | Cai | |
| 2008/0267109 A1 | 10/2008 | Wang et al. | |
| 2009/0097441 A1 | 4/2009 | Lee et al. | |
| 2009/0131063 A1 | 5/2009 | Yi et al. | |
| 2009/0190519 A1 | 7/2009 | Lee et al. | |
| 2009/0305712 A1* | 12/2009 | Franceschini | H04W 52/241 455/450 |
| 2010/0080159 A1 | 4/2010 | Hu et al. | |
| 2010/0191965 A1* | 7/2010 | Fischer | H04L 63/123 713/168 |
| 2010/0216454 A1 | 8/2010 | Ishida et al. | |
| 2010/0309836 A1 | 12/2010 | Sugawara et al. | |
| 2010/0315987 A1* | 12/2010 | Kuo | H04W 72/005 370/312 |
| 2010/0323663 A1 | 12/2010 | Vikberg et al. | |
| 2010/0329167 A1 | 12/2010 | Linden et al. | |
| 2011/0080862 A1 | 4/2011 | Cai | |
| 2011/0085488 A1 | 4/2011 | Widegren | |
| 2011/0305183 A1* | 12/2011 | Hsu | H04W 72/005 370/312 |
| 2012/0026929 A1* | 2/2012 | Wang | H04L 12/1863 370/312 |
| 2012/0159151 A1* | 6/2012 | Janakiraman | H04W 12/041 713/153 |

FOREIGN PATENT DOCUMENTS

| | | |
|---|---|---|
| CN | 101175235 A | 5/2008 |
| CN | 101529931 A | 9/2009 |
| CN | 101682848 A | 3/2010 |
| EP | 1475984 | 11/2004 |
| EP | 1983769 A1 | 10/2008 |
| EP | 2239968 A1 | 10/2010 |
| GB | 2456151 A | 7/2009 |
| GB | 2456930 A | 8/2009 |
| JP | 2007-502571 A | 2/2007 |
| JP | 2013-535916 | 9/2013 |
| WO | WO 2004/102837 A1 | 11/2004 |
| WO | WO 2005/018268 A1 | 2/2005 |
| WO | WO 2006/006965 A1 | 1/2006 |
| WO | WO 2012/015884 A1 | 2/2012 |

OTHER PUBLICATIONS

Office Action dated Feb. 22, 2019, by The Chinese Patent Office in counterpart Chinese Patent Application No. 201610709307.8.
3GPP TSG-RAN WG2 Meeting #71; "Two-Stages Method to Count RRC_IDLE UE", R2-104754, pp. 1-2 (2010).
Extended European Search Report dated Mar. 22, 2018, by the European Patent Office in counterpart European Patent Application No. 18157780.0.
3rd Generation Partnership Project; Technical Specification Group Radio Access Network; Evolved Universal Terrestrial Radio Access (E-UTRA); Radio Resource Control (RRC); Protocol specification (Release 9), 3GPP Standard; 3GPP TS 36.331 , V9.2.0, XP050402560, Apr. 21, 2010,.
International Search Report in PCT/JP2011/076123 dated Mar. 15, 2012 (English Translation Thereof).
3GPP TS 36.413, Technical Specification, $3^{rd}$ Generation Partnership Project; Technical Specification Group Radio Access Network; Evolved Universal Terrestrial Radio Access Network E-Utran); S1 Application.
Protocol (S1AP}, (Release 9), V9.4.0(Sep. 2010).
3GPP TS 23.246, Technical Specification, $3^{rd}$ Generation Partnership Project; Technical Specification Group Services and System Aspects; Multimedia Broadcast/Multicast Service BMS); Architecture and functional description, (Release 9}, V9.5.0(Jun. 2010).
3GPP TS 36.444, Technical Specification, $3^{rd}$ Generation Partnership Project; Technical Specification Group Radio Access Network; Evolved Universal Terrestrial Radio Access Network: (E-Utran); M3 Application Protocol (M3AP), (Release 9), V9.2.0(Sep. 2010).
3GPP TS 36.443, Technical Specification, $3^{ra}$ Generation Partnership Project; Technical Specification Group Radio Access Network; Evolved Universal Terrestrial Radio Access Network (E-Utran); M2 Aoplication Protocol (M2AP), (Release 9), V9.2.0(Sep. 2010).
3GPP TS 25.331, Technical Specification, 3ra Generation Partnership Project; Technical Specification Group Radio Access Network; Radio Resource Control (RRC); Protocol Specification, (Release 8), V8.7.0(Jun. 2009).
3GPP TS 36.331, Technical Specification, 3ru Generation Partnership Project; Technical Specification Group Radio Access Network; Evolved Universal Terrestrial Radio Access (E-UTRA); Radio Resource Control (RRC); Protocol Specification, (Release 8), V8.11.0(Sep. 2010).
3GPP TS 36.300, Technical Specification, 3ru Generation Partnership Project; Technical Specification Group Radio Access Network; Evolved Universal Terrestrial Radio Access (E-UTRA and Evolved Universal Terrestrial Radio Access Network (E-UTRAN) Overall Description, Stage 2 (Release 9), V9.5.0(Sep. 2010).
Ericsson, "Counting for MBMS Rel-10", 3GPP Draft; R2-103865 3rd Generation Partnership Project (3GPP), RAN WG2 #70, Stockholm, Sweden, Jun. 28-Jul. 2, 2010.
Ericsson, "On the Need of Counting MDBMS UEs in idle mode", 3GPP Draft; R2-104776 3rd Generation Partnership Project (3GPP), RAN WG2 #71, Madrid, Spain, Aug. 23-Aug. 27, 2010.
CATT,: The Counting Procedure in M2 Interface:, 3GPP Draft; R3-102702, 3rd Generation Partnership Project (3GPP), I. RAN WG3 #69bis, Xi'an, China, Oct. 11-15, 2010.
Japanese Office Action dated Apr. 2, 2014, with English translation.
Ericsson, "Counting for MBMS Rel-IO", 3GPP Draft; R2-103865 3rd Generation Partnership Project (3GPP), RAN WG2 #70, Stockholm, Sweden, Jun. 28-Jul. 2nd 2010_ (previously submitted on May 7, 2013).
3GPP TS 25.33 I VI 0.1.0, Sep. 2010, pp. 518-531, URL: http://www.gtc.jp/3GPP/Specs/25331-a10.pdf.
Ericsson, ST-Ericsson, On the need of counting MBMS UEs in idle mode [online], 3GPP TSG-RAN WG2#71 R2-104776, Internet<URL: http://www.3gpp.org/ftp/tsg_ran/WG2_RL2/TSGR2_7l/Docs/R2-104776.zip> Aug. 23, 2010 (previously submitted on May 7, 2013).
3GPP TS 23.246, Technical Specification, 3rd Generation Partnership Project; Technical Specification Group Services and System Aspects; Multimedia Broadcast/Multicast Service (MBMS); Architecture and functional description, (Release 9), V9.5.0(Jun. 2010) (previously submitted on May 7, 2013).
Global_Dossier search (Year 2020).
InnovationQ_Plus search (Year 2020).

(56) References Cited

OTHER PUBLICATIONS

3GPP TS 25.331 V10.1.0, Sep. 2010, pp. 518-531, URL, http://www.gtc.jp/3GPP/Specs/25331-a10.pdf.

* cited by examiner

COMMUNICATION SYSTEM

CROSS-REFERENCE TO RELATED PATENT APPLICATIONS

This application is a continuation of U.S. patent application Ser. No. 13/883,754, filed Jun. 21, 2013, which is a National Stage Entry of International Application No. PCT/JP2011/076123, filed Nov. 7, 2011, which claims priority from British Patent Application No. GB 1018855.5, filed Nov. 8, 2010. The entire contents of the above-referenced applications are expressly incorporated herein by reference.

TECHNICAL FIELD

The present invention relates to a communication system, and to components thereof, for the provision of services to mobile devices, and in particular to a communication system and components for the provision of multimedia services. The invention has particular, though not exclusive, relevance to the provision of a Multimedia Broadcast Multicast Service (MBMS) via Long Term Evolution (LTE) radio technology as defined in the 3rd Generation Partnership Project (3GPP) standards documentation including, for example, the most recent versions of: TS 36.300 ('E-UTRA and E-UTRAN; Overall description; Stage 2'); TS 36.331 ('E-UTRAN; Radio Resource Control protocol'); TS 36.443 ('E-UTRAN; M2 Application Protocol (M2AP)'); TS 36.444 ('E-UTRAN; M3 Application Protocol (M3AP)'); and TS 23.246 ('MBMS; Architecture and functional description').

BACKGROUND ART

Currently, as its name implies, MBMS transmission in LTE makes use of a broadcast mode to provide multimedia services and associated content to the user equipment (UE) such as mobile telephones/'cell' phones or other such communication devices. The broadcast of the multimedia services is achieved using LTE's MBMS Single Frequency Network (MBSFN) transmission in which multiple LTE Base Stations (so called 'evolved NodeBs' or 'eNBs') combine the MBMS data transmission on multiple cells. In view of the complexity of the broadcast mechanism, it is only used by the network if there are a sufficient number of interested users, for a given MBMS service, to warrant provision of the service using the broadcast transmission mode. Accordingly, in this scenario, if an insufficient number of users have expressed an interest in a particular multimedia service, the multimedia service will not be provided.

Furthermore, the mechanisms previously considered for determining the number of users in a particular coverage area who wish to receive a particular service are inaccurate, tending to undercount the number of actual interested users. In part this is because the network is unable to derive the necessary information, from many of the devices in the coverage area, to determine if their respective users wish to receive the service or not. Thus, even when there are a sufficient number of interested users in a coverage area to warrant provision of the multimedia service using the broadcast transmission mode the multimedia service may, nevertheless, still be withheld.

SUMMARY

The invention therefore aims to provide a communication system and components thereof, which addresses or at least alleviates the above issues.

One proposal considered by the inventors, for helping to ensure that users who are interested in receiving a particular multimedia service are provided with that service, regardless the number of interested users, is to allow the provision of multimedia service using unicast communication under certain conditions. Specifically, delivery via unicast communication is provided when the number of interested users is below a particular threshold (e.g. a threshold below which the provision of the multimedia service using the broadcast transmission mode is unwarranted) and delivery via multicast or broadcast communication is provided when the number of interested users is above that threshold.

The implementation of such a proposal is, however, not trivial, in part because there are currently no mechanisms that would allow the provision of unicast transmission to mobile communication devices, for an MBMS service for which the number of interested users is under a threshold below which multicast transmission is deemed not be worthwhile.

In one embodiment, the invention provides a method performed in a communication system (by respective components thereof) comprising: determining the number of mobile communications devices, in a coverage area for an MBMS service, that have indicated an interest in receiving that MBMS service; comparing the result of the determination with a predetermined threshold (e.g. a threshold above which broadcast and/or multicast communication is deemed to be acceptable); and providing the MBMS service by unicast or broadcast/multicast in dependence on the comparison.

For example, if the comparison finds the result of the determination to be less than (or at least not greater than) the threshold, the MBMS service may be provided by unicast. If the comparison finds the result of the determination to be greater than (or at least not less than the threshold), then the MBMS service may be provided by broadcast or multicast.

To facilitate the provision of unicast communication, the inventors have also formulated significant improvements in the way that the network determines the number of interested users. Specifically, the inventors have developed a method which allows the network not only to count the devices which are active (or have had an active connection at an appropriate time) but also to count devices which are camped in the coverage area but are inactive.

According to one aspect of the invention there is provided a mobile communication device for a communication system, which communication system is operable to deliver Mobility Broadcast/Multicast Service (MBMS) services, the mobile communication device comprising: means for registering the mobile communication device with a base station; means for operating in an idle mode in which the mobile communication device is registered with the base station but does not have an active connection to the base station; means for determining the identity of an MBMS service that is to be made available; and means for indicating an interest in receiving said MBMS service to said base station when said determining means has determined that said MBMS is to be made available; wherein said indicating means is operable, when said mobile communication device is in said idle mode, to indicate said interest by: initiating communications, with said base station, to establish an active connection; sending at least one message to said base station, during or after establishment of said active connection, to indicate that said establishment of an active connection is for the purposes of indicating an interest in an MBMS service.

According to another aspect of the invention there is provided a base station for a communication system, which communication system is operable to deliver Mobility Broadcast/Multicast Service (MBMS) services, the base station comprising: means for registering a plurality of mobile communication devices with the base station wherein at least one of said mobile communication device is operating in an idle mode in which the mobile communication device is registered but does not have an active connection to the base station; means for receiving an indication that a procedure should be initiated for counting the number of mobile communication devices that indicate an interest in receiving a specified MBMS service and that are registered with the base station; and means for indicating, to said plurality of mobile communication devices, the identity the specified MBMS service; means for identifying an indication of interest in the specified MBMS service from any of said plurality of mobile communication devices; wherein said identifying means is operable to identify an indication of interest in the specified MBMS service, from the at least one mobile communication device operating in an idle mode, by: entering communications, with the at least one mobile communication device operating in an idle mode, to establish an active connection; receiving at least one message from the at least one mobile communication device operating in an idle mode, during or after establishment of said active connection, to indicate that said establishment of an active connection is for the purposes of indicating an interest in said MBMS service; determining that said establishment of an active connection is for the purposes of indicating an interest in said MBMS service; and identifying the MBMS service to which said at least one message relates; means for compiling information for identifying a number of mobile communication devices that have indicated an interest in the MBMS service; and means for providing, to a network entity, the compiled information for identifying the number of mobile communication devices that have indicated an interest in the MBMS service.

According to another aspect of the invention there is provided a network entity for a communication system, which communication system is operable to deliver Mobility Broadcast/Multicast Service (MBMS) services, the network entity comprising: means for receiving a request to start an MBMS session for a specified MBMS service from a further network entity; means for determining that a procedure should be initiated for counting the number of mobile communication devices that indicate an interest in receiving said specified MBMS service; means for indicating, to at least one base station, that said procedure should be initiated for counting the number of mobile communication devices that indicate an interest in receiving said specified MBMS service and that are registered with said at least one base station; means for receiving, from said at least one base station, information for identifying a number of mobile communication devices that have indicated an interest in the MBMS service, wherein said number of mobile communication devices that have indicated an interest in the MBMS service includes at least one mobile communication device that was operating in an idle mode when said counting procedure was initiated; means for comparing said number of mobile communication devices that have indicated an interest in the MBMS service with a predetermined threshold; means for generating, when said comparison indicates that said number of mobile communication devices that have indicated an interest in the MBMS service is below said predetermined threshold, a response to said request to start an MBMS session, wherein said response includes an indication that initiation of said number of mobile communication devices that have indicated an interest in the MBMS service is below said predetermined threshold; and means for sending said generated response to said further network entity.

According to another aspect of the invention there is provided a network entity for a communication system, which communication system is operable to deliver Mobility Broadcast/Multicast Service (MBMS) services, the network entity comprising: means for determining that a procedure should be initiated for counting the number of mobile communication devices that indicate an interest in receiving a specified MBMS service that is currently being delivered via broadcast/multicast; means for indicating, to at least one base station, that said procedure should be initiated for counting the number of mobile communication devices that indicate an interest in receiving said specified MBMS service and that are registered with said at least one base station; means for receiving, from said at least one base station, information for identifying a number of mobile communication devices that have indicated an interest in the MBMS service, wherein said number of mobile communication devices that have indicated an interest in the MBMS service includes at least one mobile communication device that was operating in an idle mode when said counting procedure was initiated; means for comparing said number of mobile communication devices that have indicated an interest in the MBMS service with a predetermined threshold; means for generating, when said comparison indicates that said number of mobile communication devices that have indicated an interest in the MBMS service is below said predetermined threshold, a message to stop said specified MBMS service, wherein said response includes an indication that said number of mobile communication devices that have indicated an interest in the MBMS service is below said predetermined threshold; and means for sending said generated message to a further network entity.

According to another aspect of the invention there is provided a network entity for a communication system, which communication system is operable to deliver Mobility Broadcast/Multicast Service (MBMS) services, the network entity comprising: means for sending, to a second network entity, a request to start an MBMS session for a specified MBMS service; means for receiving, from said second network entity, a response to said request to start an MBMS session, wherein said response includes an indication that a number of mobile communication devices that have indicated an interest in the MBMS service is below a predetermined threshold; and means for determining that said MBMS service is to be delivered by unicast communication in response to said indication that a number of mobile communication devices that have indicated an interest in the MBMS service is below a predetermined threshold.

According to another aspect of the invention there is provided network entity for a communication system, which communication system is operable to deliver Mobility Broadcast/Multicast Service (MBMS) services, the network entity comprising: means for sending, to a second network entity, a request to start an MBMS session for a specified MBMS service; means for receiving, from said second network entity, a message to stop a specified MBMS service that is currently being delivered by broadcast/multicast, wherein said message includes an indication that said number of mobile communication devices that have indicated an interest in the MBMS service is below said predetermined threshold; and means for determining that said MBMS service is to be delivered by unicast communication in response to said indication that a number of mobile communication devices that have indicated an interest in the MBMS service is below a predetermined threshold.

According to another aspect of the invention there is provided a base station for a communication system, which communication system is operable to deliver Mobility Broadcast/Multicast Service (MBMS) services, the base station comprising: means for receiving, from a network entity, a request to set up a radio bearer for the delivery of an MBMS service via unicast to a mobile communication device; means for generating, in response to receipt of said request to set up a radio bearer, a message (e.g. an RRC message such as an RRC Connection Reconfiguration message) to configure said radio bearer, at said mobile communication device, for the delivery of the MBMS service via unicast; means for sending, to said mobile communication device, said generated message to configure said radio bearer for the delivery of the MBMS service via unicast; means for receiving, from said mobile communication device, a message indicating (e.g. an RRC message such as an RRC Connection Reconfiguration Complete message) that said radio bearer has been configured by said mobile communication device for receipt of the MBMS service via unicast; means for generating, in response to receipt of said message indicating that said radio bearer has been configured by said mobile communication device for receipt of the MBMS service via unicast, a response to said request to set up a radio bearer for the delivery of the MBMS service via unicast; and means for sending said generated response to said network entity.

According to another aspect of the invention there is provided a mobile communication device for a communication system, which communication system is operable to deliver Mobility Broadcast/Multicast Service (MBMS) services, the mobile communication device comprising: means for receiving, from a base station, a message to configure a radio bearer for the delivery of the MBMS service via unicast; means for configuring said radio bearer for receipt of said MBMS service via unicast in response to receipt of said message to configure said radio bearer; means for generating, a message indicating that said radio bearer has been configured by said mobile communication device for receipt of the MBMS service via unicast; and means for sending said generated message to said base station.

According to another aspect of the invention there is provided a mobile communication device for a communication system, which communication system is operable to deliver Mobility Broadcast/Multicast Service (MBMS) services, the mobile communication device comprising: means for determining an identity of an MBMS service that said mobile communication device is to be made available; means for indicating an interest in said MBMS service to a network entity; means for determining that an identifier of said MBMS service in which said interest has been indicated is absent from a control channel; and means for initiating, in response to the absence of said identifier, delivery of said MBMS service in which said interest has been indicated via unicast communication.

According to another aspect of the invention there is provided a mobile communication device for a communication system, which communication system is operable to deliver Mobility Broadcast/Multicast Service (MBMS) services, the mobile communication device comprising: means for determining an identity of an MBMS service that is to be made available; means for indicating an interest in said MBMS service to a network entity; means for determining that an identifier of said MBMS service in which said interest has been indicated is absent from a control channel; and means for initiating, in response to the absence of said identifier, delivery of said MBMS service in which said interest has been indicated via unicast communication.

According to another aspect of the invention there is provided a method performed by a mobile communication device of a communication system, which communication system is operable to deliver Mobility Broadcast/Multicast Service (MBMS) services, the method comprising: registering the mobile communication device with a base station; operating in an idle mode in which the mobile communication device is registered with the base station but does not have an active connection to the base station; determining the identity of an MBMS service that is to be made available; and indicating an interest in receiving said MBMS service to said base station when said determining means has determined that said MBMS is to be made available; wherein said indicating step comprises, when said mobile communication device is in said idle mode, indicating said interest by: initiating communications, with said base station, to establish an active connection; sending at least one message to said base station, during or after establishment of said active connection, to indicate that said establishment of an active connection is for the purposes of indicating an interest in an MBMS service.

According to another aspect of the invention there is provided a method performed by a base station of a communication system, which communication system is operable to deliver Mobility Broadcast/Multicast Service (MBMS) services, the method comprising: registering a plurality of mobile communication devices with the base station wherein at least one of said mobile communication device is operating in an idle mode in which the mobile communication device is registered but does not have an active connection to the base station; receiving an indication that a procedure should be initiated for counting the number of mobile communication devices that indicate an interest in receiving a specified MBMS service and that are registered with the base station; and indicating, to said plurality of mobile communication devices, the identity the specified MBMS service; identifying an indication of interest in the specified MBMS service from any of said plurality of mobile communication devices; wherein said identifying step comprises identifying an indication of interest in the specified MBMS service, from the at least one mobile communication device operating in an idle mode, by: entering communications, with the at least one mobile communication device operating in an idle mode, to establish an active connection; receiving at least one message from the at least one mobile communication device operating in an idle mode, during or after establishment of said active connection, to indicate that said establishment of an active connection is for the purposes of indicating an interest in said MBMS service; determining that said establishment of an active connection is for the purposes of indicating an interest in said MBMS service; and identifying the MBMS service to which said at least one message relates; compiling information for identifying a number of mobile communication devices that have indicated an interest in the MBMS service; and providing, to a network entity, the compiled information for identifying the number of mobile communication devices that have indicated an interest in the MBMS service.

According to another aspect of the invention there is provided a method performed by a network entity of a communication system, which communication system is operable to deliver Mobility Broadcast/Multicast Service (MBMS) services, the method comprising: receiving a request to start an MBMS session for a specified MBMS service from a further network entity; determining that a procedure should be initiated for counting the number of mobile communication devices that indicate an interest in receiving said specified MBMS service; indicating, to at least one base station, that said procedure should be initiated for counting the number of mobile communication devices that indicate an interest in receiving said specified MBMS service and that are registered with said at least one base station; receiving, from said at least one base station, information for identifying a number of mobile communication devices that have indicated an interest in the MBMS service, wherein said number of mobile communication devices that have indicated an interest in the MBMS service includes at least one mobile communication device that was operating in an idle mode when said counting procedure was initiated; comparing said number of mobile communication devices that have indicated an interest in the MBMS service with a predetermined threshold; generating, when said comparison indicates that said number of mobile communication devices that have indicated an interest in the MBMS service is below said predetermined threshold, a response to said request to start an MBMS session, wherein said response includes an indication that initiation of said number of mobile communication devices that have indicated an interest in the MBMS service is below said predetermined threshold; and sending said generated response to said further network entity.

According to another aspect of the invention there is provided a method performed by a network entity of a communication system, which communication system is operable to deliver Mobility Broadcast/Multicast Service (MBMS) services, the method comprising: determining that a procedure should be initiated for counting the number of mobile communication devices that indicate an interest in receiving a specified MBMS service that is currently being delivered via broadcast/multicast; indicating, to at least one base station, that said procedure should be initiated for counting the number of mobile communication devices that indicate an interest in receiving said specified MBMS service and that are registered with said at least one base station; receiving, from said at least one base station, information for identifying a number of mobile communication devices that have indicated an interest in the MBMS service, wherein said number of mobile communication devices that have indicated an interest in the MBMS service includes at least one mobile communication device that was operating in an idle mode when said counting procedure was initiated; comparing said number of mobile communication devices that have indicated an interest in the MBMS service with a predetermined threshold; generating, when said comparison indicates that said number of mobile communication devices that have indicated an interest in the MBMS service is below said predetermined threshold, an indication to stop said specified MBMS session, wherein said indication includes an indication that initiation of said number of mobile communication devices that have indicated an interest in the MBMS service is below said predetermined threshold; and sending said generated response to a further network entity.

According to another aspect of the invention there is provided a method performed by a network entity of a communication system, which communication system is operable to deliver Mobility Broadcast/Multicast Service (MBMS) services, the method comprising: sending, to a second network entity, a request to start an MBMS session for a specified MBMS service; receiving, from said second network entity, a response to said request to start an MBMS session, wherein said response includes an indication that a number of mobile communication devices that have indicated an interest in the MBMS service is below a predetermined threshold; and determining that said MBMS service is to be delivered by unicast communication in response to said indication that a number of mobile communication devices that have indicated an interest in the MBMS service is below a predetermined threshold.

According to another aspect of the invention there is provided a method performed by a network entity of a communication system, which communication system is operable to deliver Mobility Broadcast/Multicast Service (MBMS) services, the network entity comprising: sending, to a second network entity, a request to start an MBMS session for a specified MBMS service; receiving, from said second network entity, an indication to stop a specified MBMS service that is currently being delivered by broadcast/multicast, wherein said indication includes an indication that said number of mobile communication devices that have indicated an interest in the MBMS service is below said predetermined threshold; and determining that said MBMS service is to be delivered by unicast communication in response to said indication that a number of mobile communication devices that have indicated an interest in the MBMS service is below a predetermined threshold.

According to another aspect of the invention there is provided a method performed by a base station of a communication system, which communication system is operable to deliver Mobility Broadcast/Multicast Service (MBMS) services, the method comprising: receiving, from a network entity, a request to set up a radio bearer for the delivery of an MBMS service via unicast to a mobile communication device; generating, in response to receipt of said request to set up a radio bearer, a message (e.g. an RRC message such as an RRC Connection Reconfiguration message) to configure said radio bearer, at said mobile communication device, for the delivery of the MBMS service via unicast; sending, to said mobile communication device, said generated message to configure said radio bearer for the delivery of the MBMS service via unicast; receiving, from said mobile communication device, a message indicating (e.g. an RRC message such as an RRC Connection Reconfiguration Complete message) that said radio bearer has been configured by said mobile communication device for receipt of the MBMS service via unicast; generating, in response to receipt of said message indicating that said radio bearer has been configured by said mobile communication device for receipt of the MBMS service via unicast, a response to said request to set up a radio bearer for the delivery of the MBMS service via unicast; and means for sending said generated response to said network entity.

According to another aspect of the invention there is provided a method performed by a mobile communication device of a communication system, which communication system is operable to deliver Mobility Broadcast/Multicast Service (MBMS) services, the method comprising: receiving, from a base station, a message to configure a radio bearer for the delivery of the MBMS service via unicast; configuring said radio bearer for receipt of said MBMS service via unicast in response to receipt of said message to configure said radio bearer; generating, a message indicating that said radio bearer has been configured by said mobile communication device for receipt of the MBMS service via unicast; and sending said generated message to said base station.

According to another aspect of the invention there is provided a method performed by a mobile communication device of a communication system, which communication system is operable to deliver Mobility Broadcast/Multicast Service (MBMS) services, the method comprising: determining an identity of an MBMS service that said mobile communication device is to be made available; indicating an interest in said MBMS service to a network entity; determining that an identifier of said MBMS service in which said interest has been indicated is absent from a control channel; and initiating, in response to the absence of said identifier, delivery of said MBMS service in which said interest has been indicated via unicast communication.

According to another aspect of the invention there is provided a method performed by a mobile communication device of a communication system, which communication system is operable to deliver Mobility Broadcast/Multicast Service (MBMS) services, the method comprising: determining an identity of an MBMS service that is to be made available; indicating an interest in said MBMS service to a network entity; determining that an identifier of said MBMS service in which said interest has been indicated is absent from a control channel; and initiating, in response to the absence of said identifier, delivery of said MBMS service in which said interest has been indicated via unicast communication.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

The description of the invention with reference to the drawings is by way of example only.

The text of the abstract filed herewith is repeated here as part of the specification. In an exemplary aspect of the invention of the invention there is provided a communication system is described in which an MBMS service is provided by unicast or broadcast/multi cast communication in dependence on whether the number of mobile communication devices indicating an interest in receiving the service is below or above a broadcast threshold. An improved procedure for counting the number of mobile communication devices interested in receiving the MBMS service is also disclosed.

BRIEF DESCRIPTION OF THE DRAWINGS

Embodiments of the invention will now be described by way of example only with reference to the attached figures in which.

DETAILED DESCRIPTION OF EXEMPLARY EMBODIMENTS

Overview

Figure 1:
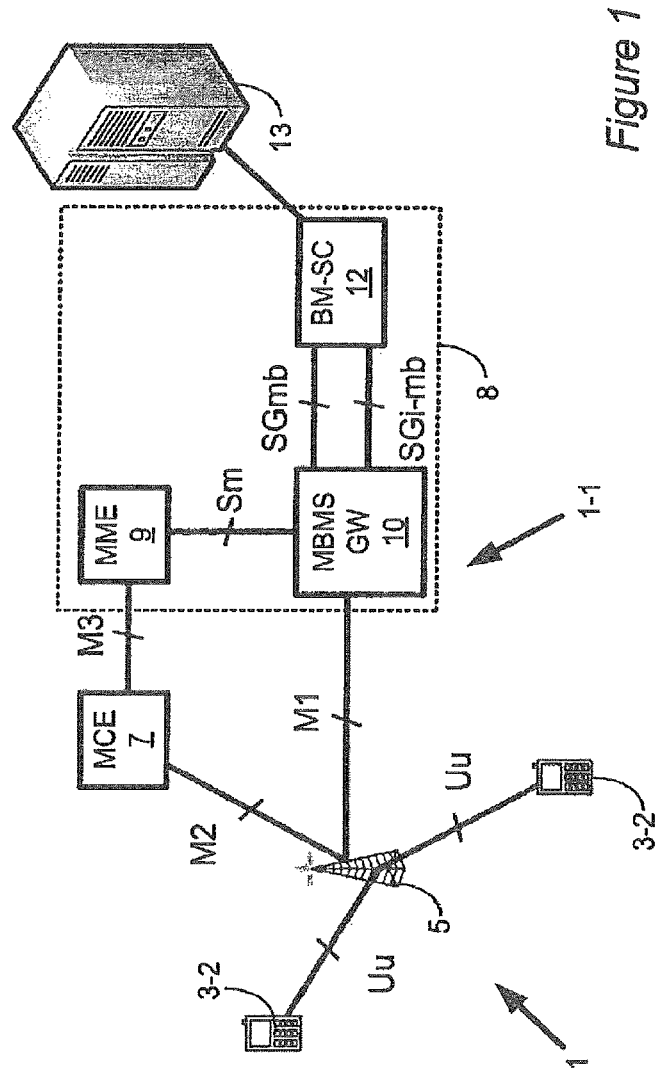
FIG. 1 shows, in simplified overview, a schematic of an architecture for the provision of multimedia broadcast/multicast services (MBMS) in a communication system.
Figure 2:
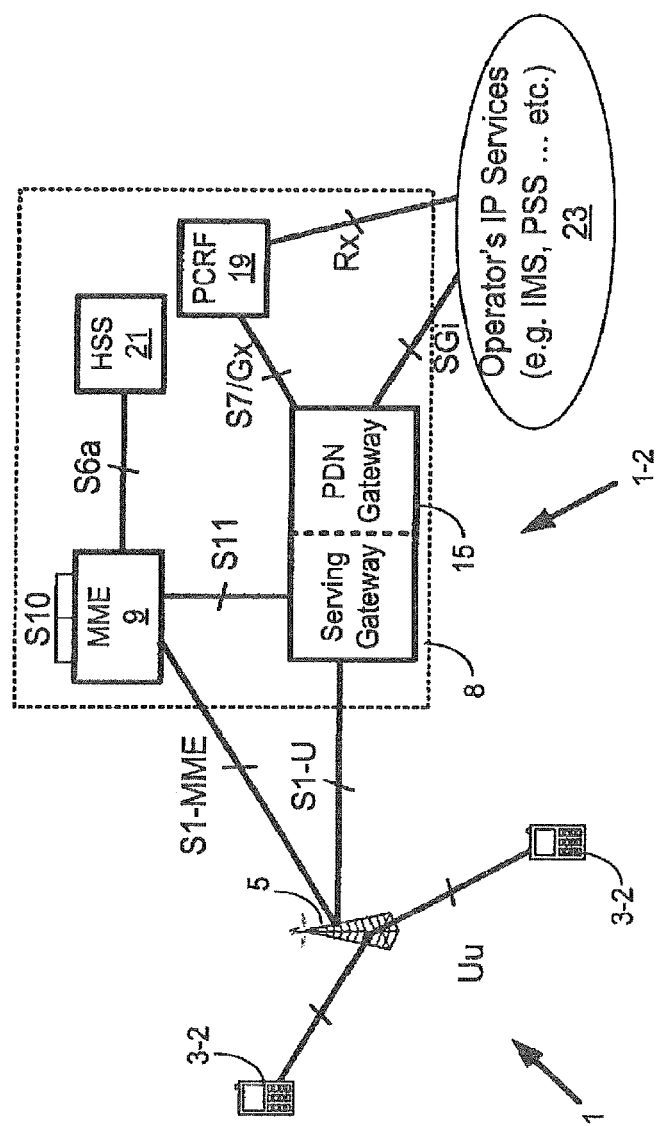
FIG. 2 shows, in simplified overview, a schematic of an architecture for the provision of unicast communication in the communication system of FIG. 1.

FIGS. 1 and 2 each schematically illustrates a mobile (cellular) communication system 1 for providing MBMS services. The communication system 1 comprises user equipment 3, including a plurality of mobile communication devices 3-1, 3-2 (also referred to herein as UEs) served by a base station 5. In this embodiment, the base station 5 is an LTE base station (also referred to herein as an 'evolved NodeB' or 'eNB') forming part an Evolved Universal Technology Radio Access Network (E-UTRAN). The telecommunication system 1 also comprises core network 8 comprising and Evolved Packet Core (EPC) which includes a plurality of functional/logical entities.

Although, for simplicity, a single base station 5 and two mobile communication devices 3 are shown, the E-UTRAN will generally comprise a plurality of base stations 5 and each base station 5 may serve one or any number of mobile communication devices 3 or other such communication devices.

MBMS Delivery System Architecture

As seen in FIG. 1 the communication system 1 comprises a system architecture 1-1 for the delivery of multimedia broadcast/multicast services (MBMS). The system architecture 1-1 for the delivery of multimedia broadcast/multicast services (MBMS) comprises a Multi-cell/Multicast Coordination Entity (MCE) 7, which forms part of the E-UTRAN. The MBMS delivery system architecture 1-1 also comprises a Mobility Management Entity (MME) 9, an MBMS Gateway (MBMS-GW) 10, a Broadcast-Multicast Service Centre (BM-SC) 12 all of which form part of the core network 8. In operation, therefore, a content provider 13 is able to provide content, such as multimedia content, as an MBMS service using the system architecture 1-1.

In the context of the MBMS delivery system architecture 1-1, the base station 5 of the E-UTRAN is responsible for delivering MBMS data to a designated MBMS service area efficiently.

The MCE 7 schedules the time/frequency resources on the radio interface and is responsible for coordinating multi-cell transmission where the coverage area for a particular MBMS service includes multiple base stations 5. The MCE 7 is a logical entity which, in this embodiment, is physically separate from the base station 5. The MCE 7 communicates with the base station 5 via a control plane interface 'M2' and with the MME 9 via a further control plane interface 'M3'.

The MME 9 is a control node for the LTE access network and, in the context of MBMS delivery system architecture 1-1, provides a number of MBMS support functions including session control of MBMS bearers and transmission of session control messages (such as Session Start and Session Stop messages) towards the base station 5 of the E-UTRAN via the M3 interface. The MME 9 communicates with the MBMS-GW 10 using a further interface 'Sm' via which the MME 9 receives MBMS service control messages and IP Multicast addresses for MBMS data reception.

The MBMS-GW 10 acts as an entry point for incoming broadcast/multicast data. The MBMS-GW 10 is responsible for distributing data packets for a particular MBMS service to base stations within the coverage area for that MBMS service (e.g. an area covered by an MBMS Single Frequency Network (MBSFN)), for example by IP multicast distribution of MBMS data packets to the base station 5 through user plane interface 'M1'. The MBMS-GW also implements MBMS session management (for example, by using Session Start and Session Stop messages). The MBMS-GW 10 communicates with the BM-SC via a user plane interface 'SGi-mb' and a control plane interface 'SGmb'.

The BM-SC 12 is the source of the MBMS traffic and provides functions for MBMS user service provisioning and delivery. In this embodiment, the BM-SC 12 serves as an entry point for MBMS transmissions from the content provider 13, can be used to authorise and initiate MBMS Bearer Services within the mobile network, and can be used to schedule and deliver the MBMS transmissions, using the SGi-mb interface for MBMS data delivery and the SGmb interface for control functions.

Unicast Delivery System Architecture

As seen in FIG. 2 the communication system 1 also comprises a system architecture 1-2 for unicast delivery (also referred to herein a Packet-Switched Streaming Services (PSS) architecture). In the system architecture 1-2 for unicast delivery, the core network 8 comprises the MME 9, a combined Serving Gateway and Packet Data Network-Gateway (SGW/PDN-GW) 15, a Policy and Charging Rules Function (PCRF) 19, and a Home Subscriber Server (HSS) 21. In operation, an operator 23 is able to provide IP services, such as IP Multimedia Subsystem (IMS) services and Packet-switched Streaming (PSS) services, via the unicast delivery system architecture 1-2.

In the context of the unicast delivery system architecture 1-2, the base station 5 of the E-UTRAN is responsible for establishing point-to-point radio bearer resources towards each mobile communication device 3 and for delivering data to it. The E-UTRAN communicates with the core network via a logical interface 'S1' having a control plane part 'S1-MME' and a user plane part 'S1-U'.

In the context of the unicast delivery system architecture 1-2, the MME 9 handles bearer management functions including dedicated bearer establishment control towards each mobile communication device 3 via a the base station 5 of the E-UTRAN. The MME 9 communicates with the base station 5 via the control plane part of the S1 interface (S1-MME) and with the SGW part of the SGW/PDN-GW 15 via a further interface S11. The MME 9 also communicates subscription and authentication data for authenticating user access with the Home Subscriber Server (HSS) 21 via a so called 'S6a' interface.

The SGW part of the SGW/PDN-GW 15 routes packet data to the base station 5 of the E-UTRAN via the user plane part of the S1 interface S1-U. The PDN-GW part of the SGW/PDN-GW 15 provides connectivity to the mobile communication device 3 for the connection to a PSS server (not shown) provided by the operator 23. The PDN-GW part of the SGW/PDN-GW 15 communicates with the operator's network via another interface 'SGi'.

The PCRF 19 is the policy and charging control element which communicates with the PDN-GW part of SGW/PDN-GW 15 and the operator's network via respective 'Gx' (or 'S7' in some versions of the architecture) and 'Rx' interfaces.

The HSS 21 is a network element that acts as a central repository of subscriber-specific authorizations and service profiles and preferences for an IMS network.

Adaptation of System Architectures

The various components of the communication system 1 of FIGS. 1 and 2 are adapted to allow a dedicated radio access bearer (RAB) resource to be setup towards an individual mobile communication device 3 for the provision of a multimedia (MBMS) service to that mobile communication device 3 using unicast communication. Specifically, the unicast communication is achieved, using the Packet-Switched Streaming Services (PSS) protocol, as an upper layer application function of the system architecture 1-2 shown in FIG. 2. When E-UTRAN is used for the radio access, the RAB is called an E-RAB (EPS RAB).

The communication system 1 provides an MBMS service, to each mobile communication device 3 that indicates an interest in receiving that MBMS service (referred to herein as an 'interested' mobile communication device), using the unicast communication functionality when the number of interested mobile communication devices 3 is below a predetermined threshold (referred to herein as a 'broadcast' threshold). When the number of interested mobile communication devices 3 is above the broadcast threshold then the MBMS service is provided using broadcast/multicast communications in a conventional manner.

To facilitate accurate decision making relating to when unicast should be used and when broadcast/multicast communication is more appropriate, the communication system 1 uses an improved mechanism for determining the number of interested mobile communication devices 3, within the coverage area for a particular MBMS service. The counting mechanism not only takes account of mobile communication devices 3 having an active radio connection, but also takes account of mobile communication devices 3 that are inactive (in idle mode). This is achieved by providing a procedure via which idle mode mobile communication devices 3 can indicate their interest in receiving an MBMS service, can be counted for the purposes of determining whether broadcast/multicast communication is appropriate, and can be identified for the purposes of setting up unicast radio bearers for the provision of the MBMS service of interest.

Accordingly, the communication system 1 described provides a number of benefits including greater accuracy when determining the number of interested users in the coverage area for a particular service. This in turn ensures that the decision-making process for determining when to use the networks broadcast/multicast functionality for providing an MBMS service, and when not to, is greatly improved. Moreover, the communication system 1 also provides a mechanism via which mobile communication devices 3 can receive an MBMS service regardless of the number of mobile communication devices in the associated coverage that have indicated an interest in receiving that MBMS service. Taking account of the number of idle mode mobile communication devices 3 is also particularly beneficial because a user of an idle mode communication device 3 may be more likely to want to receive a particular MBMS service than a user of a mobile communication device 3 that is active, for example, because the user of the active device is busy making a voice call.

Mobile Communication Device

Figure 3:
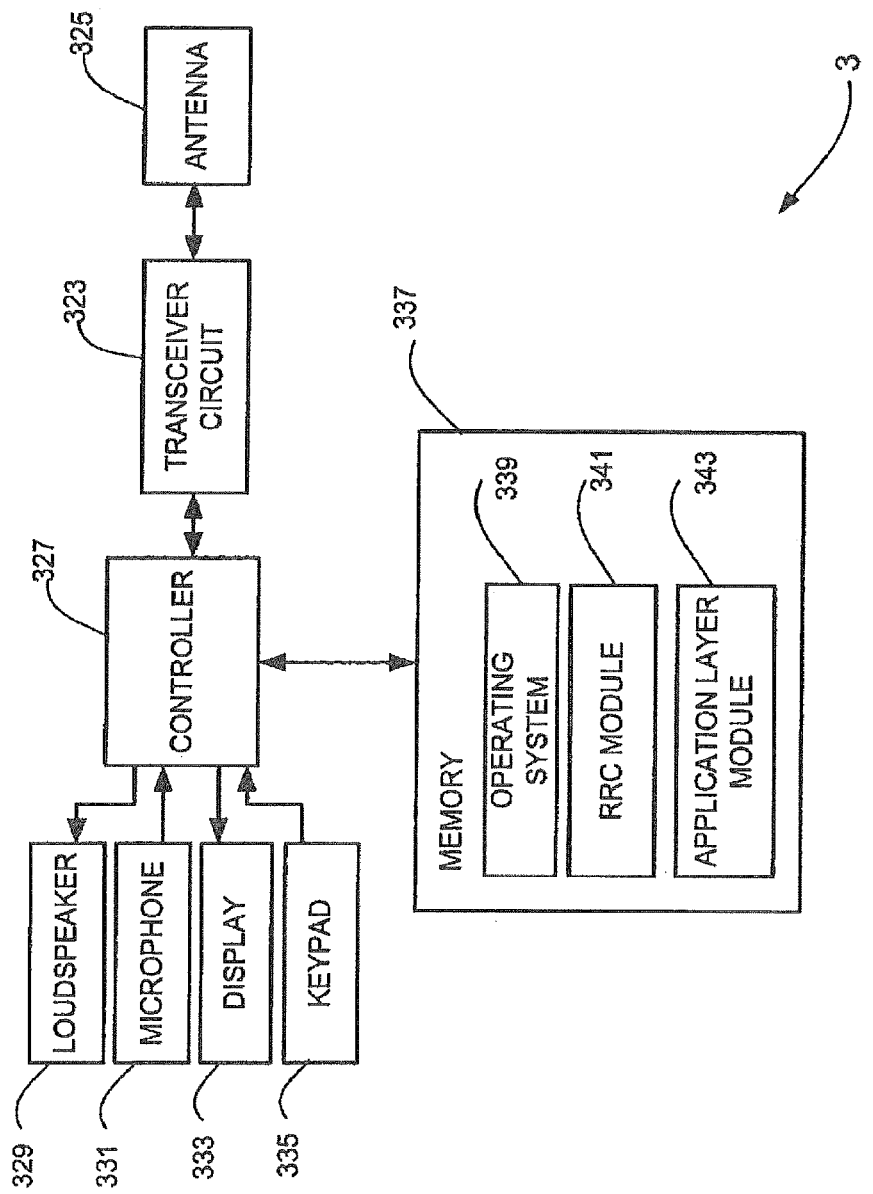
FIG. 3 is a simplified block diagram of a mobile communication device forming part of the system shown in FIGS. 1 and 2.

FIG. 3 schematically illustrates the main components of a mobile communication device 3 of FIGS. 1 and 2. As shown, the mobile communication device comprises a mobile telephone 3 including transceiver circuitry 323 which is operable to transmit signals to and to receive signals from the base station 5 via one or more antennae 325. As shown, the mobile telephone 3 also includes a controller 327 which controls the operation of the mobile telephone 3 and which is connected to the transceiver circuit 323 and to a loudspeaker 329, a microphone 331, a display 333, and a keypad 335. The controller 327 operates in accordance with software instructions stored within memory 337. As shown, these software instructions include, among other things, an operating system 339, an RRC module 341, and an application layer module 343.

The RRC module 341 manages the reception, transmission, and interpretation of radio resource control signalling communicated with the base station 5. The RRC module 341 also controls RRC layer functionality in the mobile telephone 3 and manages signalling to and from an application layer. The application layer module 343 controls application layer functionality of the mobile telephone 3 including signalling to and from the RRC layer.

Base Station

Figure 4:
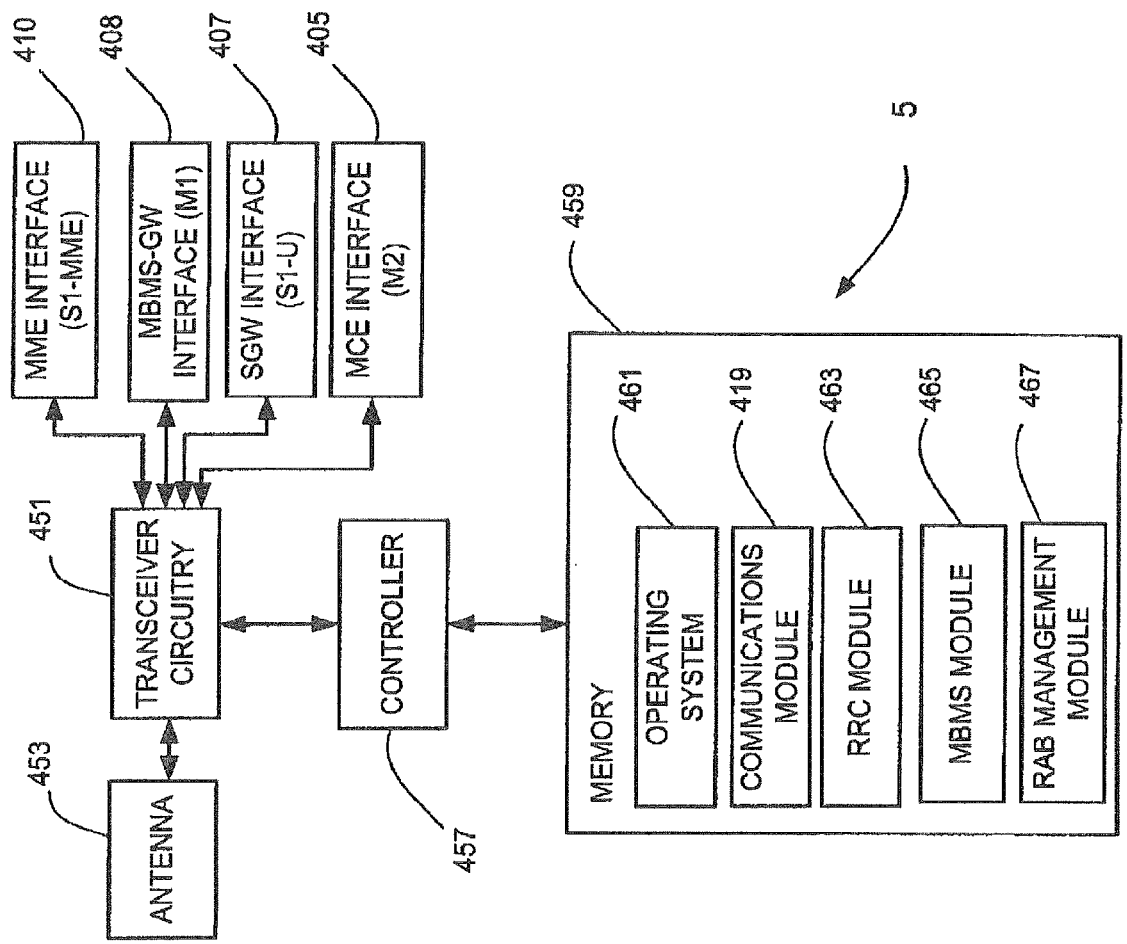
FIG. 4 is a simplified block diagram of a base station forming part of the system shown in FIGS. 1 and 2.

FIG. 4 is a block diagram illustrating the main components of the base stations 5 shown in FIGS. 1 and 2. As shown, the base station 5 includes transceiver circuitry 451, which is operable to transmit signals to, and to receive signals from, the mobile telephone 3 via one or more antennae 453. Transceiver circuitry 451 is also coupled to an MCE interface 405, an SGW interface 407, an MBMS-GW interface 408 and an MME interface 410. The various interfaces 405, 407, 408 and 410 have corresponding logical interfaces (sometimes referred to as reference points) M2, S1-U, M1, and S1-MME as indicated in FIG. 4 in parenthesis.

The operation of the transceiver circuitry 451 is controlled by a controller 457, in accordance with software stored in memory 459. The software includes, among other things, an operating system 461, a communications module 419, an RRC module 463, an MBMS module 465, and a RAB management module 467.

The communications module 419 is operable to communicate: with the MCE 7 via the MCE interface 405; with the SGW/PDN-GW 15 via the SGW interface 407; with the MBMS-GW 10 via the MBNMS-GW interface 408; and with the MME via the MME interface 410. The RRC module 463 manages the reception, transmission, and interpretation of radio resource control signalling communicated with the mobile telephone 3. The MBMS module 465 manages the reception, transmission, and interpretation MBMS related messages communicated with the MCE 7 and with the MBMS-GW 10. The RAB management module 469 manages the reception, transmission, interpretation, and handling of E-RAB setup related messages communicated with the SGW/PDN-GW 15 and with the MME 9.

Multi-Cell/Multicast Coordination Entity (MCE)

Figure 5:
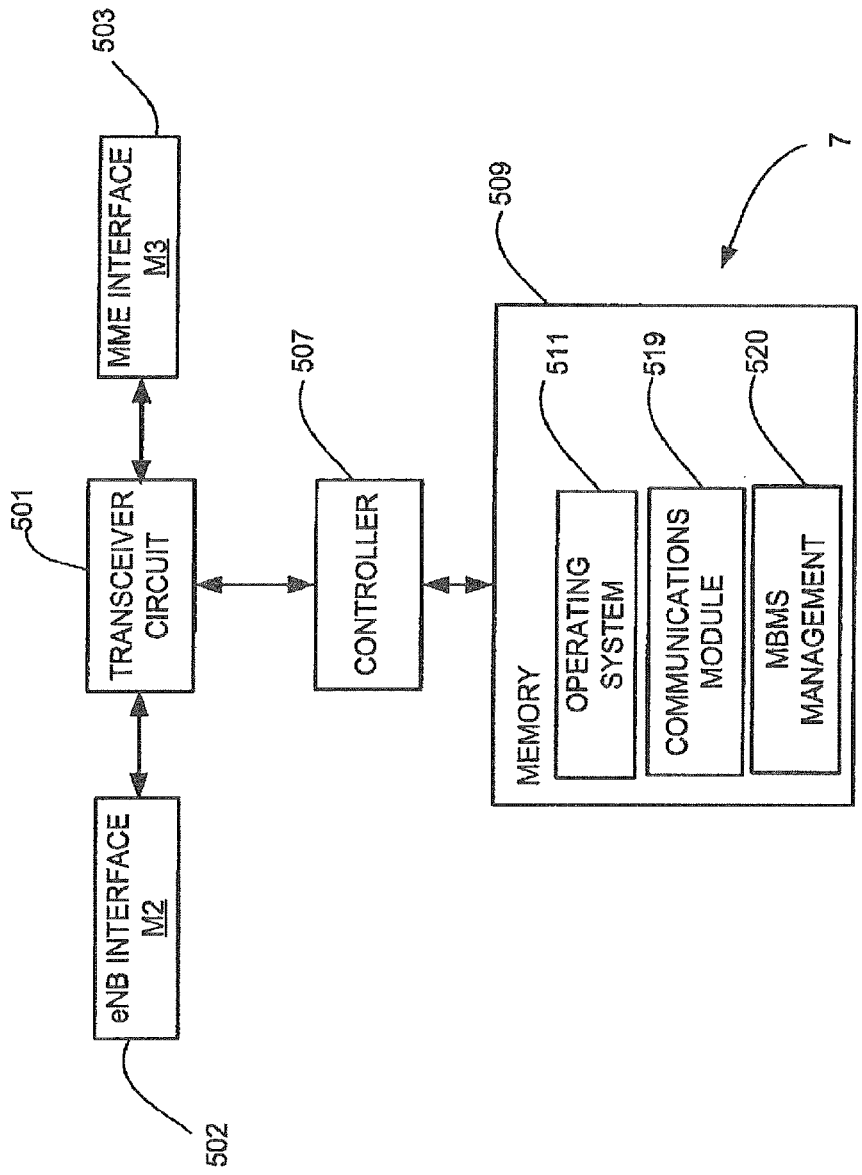
FIG. 5 is a simplified block diagram of a Multi-cell/Multicast Coordination Entity (MCE) forming part of the system shown in FIG. 1.

FIG. 5 shows an MCE 7 having a transceiver circuit 501 coupled to an eNB interface 502 and an MME interface 503. The interfaces 502 and 503 have corresponding logical interfaces (sometimes referred to as reference points) M2 and M3 as indicated in FIG. 5 in parenthesis.

A controller 507 is provided to control the transceiver circuit 501, and is coupled to a memory 509 comprising software including, among other things an operating system 511, a communications module 519 and an MBMS management module 520. The communications module 519 is operable to communicate with the base station 5 via the eNB interface 502 and with the MME via the MME interface 503. The MBMS management module 520 manages the receipt and transmission of MBMS related signalling from and to the MME 9, and from and to the base station 5, in cooperation with the communications module 519. The MBMS related signalling comprises, for example, session control signalling and other session management signaling and radio configuration for the multi-cell transmission mode data.

Mobility Management Entity (MME)

Figure 6:
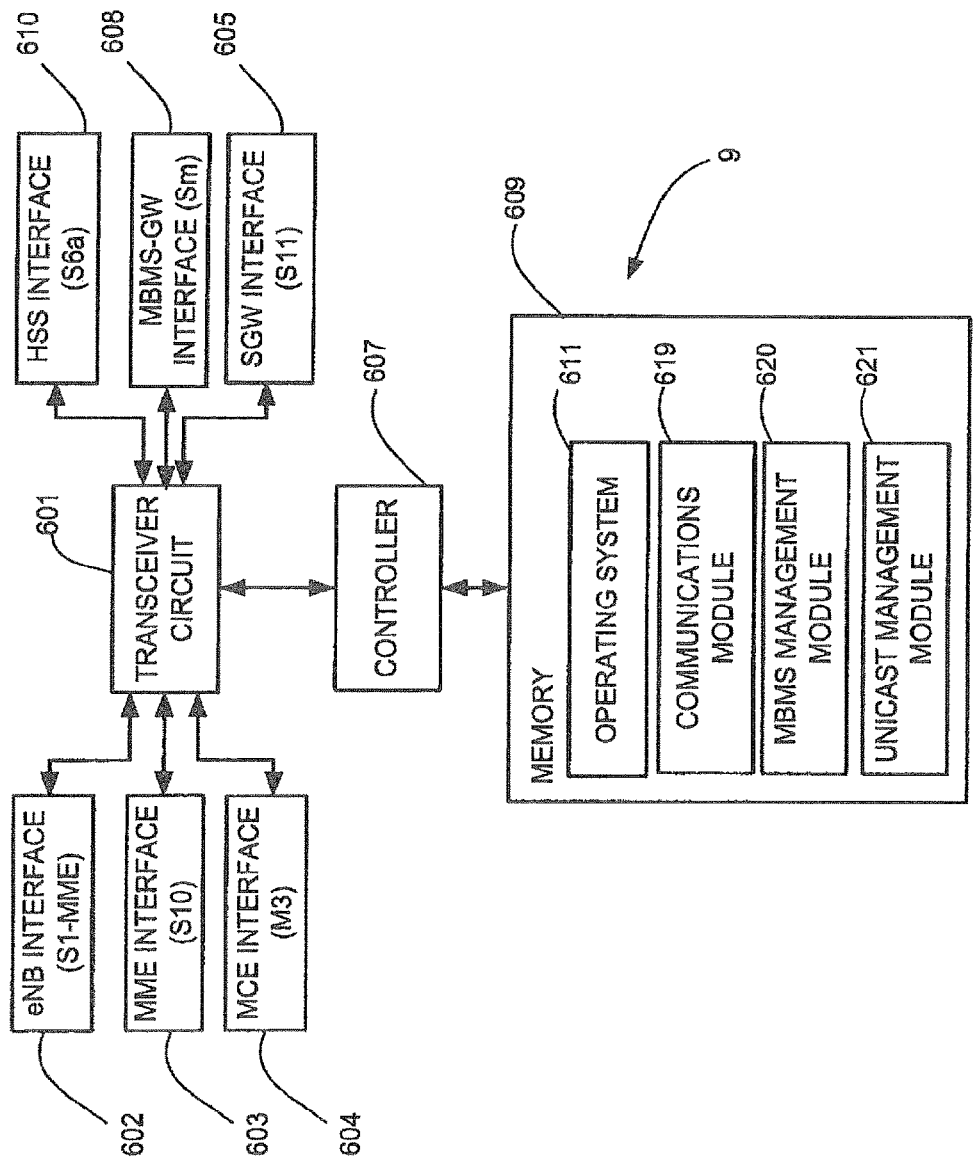
FIG. 6 is a simplified block diagram of a mobility management entity (MME) forming part of the system shown in FIGS. 1 and 2.

FIG. 6 shows an MME 9 having a transceiver circuit 601 coupled to an eNB interface 602, an MME interface 603, an MCE interface 604, an SGW interface 605, an MBMS-GW interface 608, and an HSS interface 610. The various interfaces 602, 603, 604, 605, 608, 610 have corresponding logical interfaces (sometimes referred to as reference points) S1-MME, S10, M3, S11, Sm and S6a as indicated in FIG. 6 in parenthesis.

A controller 607 is provided to control the transceiver circuit 601, and is coupled to a memory 609 comprising software including, among other things an operating system 611, a communications module 619, an MBMS management module 620, and a unicast management 3 module 621.

The communications module 619 is operable to communicate: with the base station 5 via the eNB interface 602; with other MMEs (not shown) via the MME interface 603; with the MCE via the MCE interface 604; with the SGW part of the SGW/PDN-GW 15 via the SGW interface 605; with the MBMS-GW 10 via the MBMS-GW interface 608; and with the HSS 21 via the HSS interface 610.

The MBMS management module 620 manages the receipt and transmission of MBMS related signalling from and to the MCE 7, and from and to the MBMS-GW 10, in cooperation with the communications module 619. The MBMS related signalling comprises, for example: Session Start and Session Stop messages and related signalling; other MBMS service control messages; and the IP Multicast address for MBMS data reception; sent from the MBMS-GW via the MBMS-GW (Sm) interface 608.

The unicast management module 621 manages the provision of unicast delivery of MBMS services to the mobile communication devices 3 including the setup and release of associated radio access bearers to the mobile communication devices 3 for each MBMS service.

MBMS Gateway (MBMS-GW)

Figure 7:
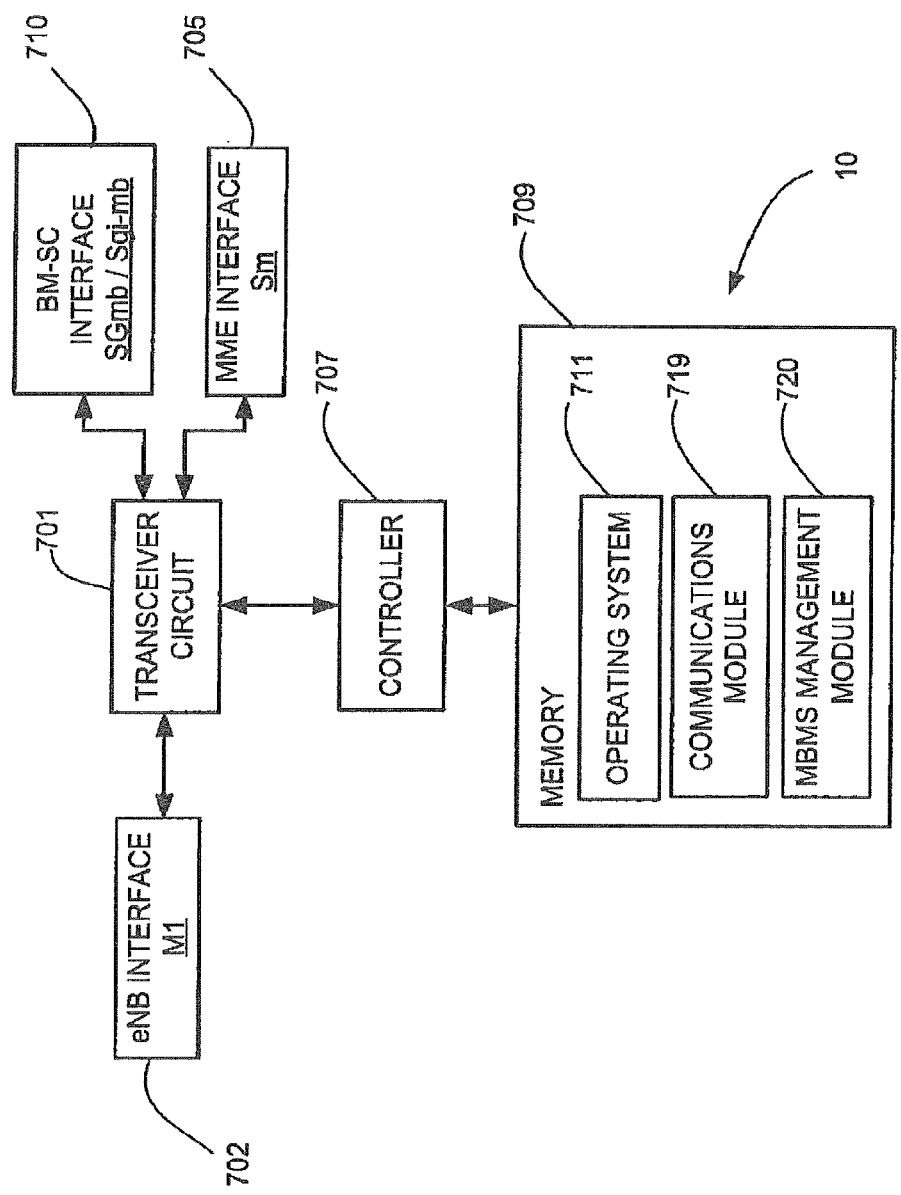
FIG. 7 is a simplified block diagram of an MBMS Gateway (MBMS-GW) forming part of the system shown in FIG. 1.

FIG. 7 shows an MBMS-GW 10 having a transceiver circuit 701 coupled to an eNB interface 702, an MME interface 705 and a BM-SC interface 710. The various interfaces 702, 705, 710 have corresponding logical interfaces (sometimes referred to as reference points) M1, SGmb/SGi-mb, and Sm as indicated in FIG. 7 in parenthesis.

A controller 707 is provided to control the transceiver circuit 701, and is coupled to a memory 709 comprising software including, among other things, an operating system 711, a communications module 719 and an MBMS management module 720. The communications module 719 is operable to communicate: with the base station 5 via the eNB interface 702; with the MME via the MME interface 705; and with the BM-SC via the BM-SC interface 710.

The MBMS management module 720 manages the distribution of MBMS data packets to base stations 3 within the MBSFN, for example by IP multicast of the MBMS data packets to the eNB 5 through the eNB (M1) interface 702. The MBMS management module 720 is also responsible for MBMS session management, for example, by transmitting the Session Start and Session Stop messages to the MME 9.

Broadcast-Multicast Service Centre (BM-SC)

Figure 8:
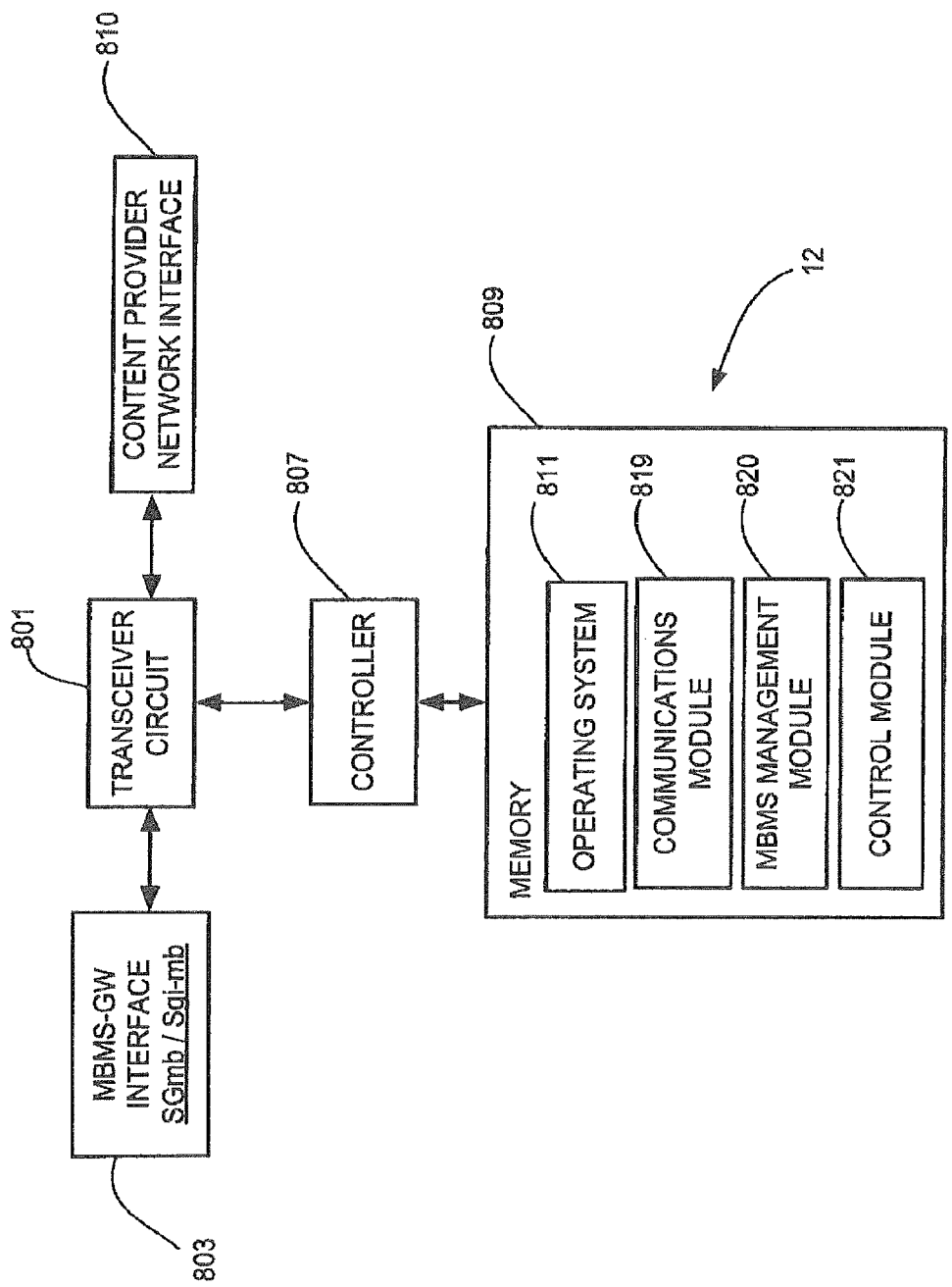
FIG. 8 is a simplified block diagram of a Broadcast-Multicast Service Centre (BM-SC) forming part of the system shown in FIG. 1.

FIG. 8 shows a BM-SC 12 having a transceiver circuit 801 coupled to an MBMS-GW interlace 803 and a content provider interface 810. The MBMS-GW interface 803 has corresponding logical user plane interface SGi-mb and control plane interface SGmb (sometimes referred to as reference points).

A controller 807 is provided to control the transceiver circuit 801, and is coupled to a memory 809 comprising software including, among other things, an operating system 811, a communications module 819 and an MBMS management module 820.

The communications module 819 is operable to communicate MBMS data to the MBMS gateway via the user plane interface (SGi-mb) part of interface 803 and control signalling via the control plane interface (SGmb) part of interface 803. The communications module 819 is also operable to receive content from the content provider 13 via the content provider interface 810.

The MBMS management module 820 manages the MBMS functions of the BM-SC 12 including the initiation of MBMS traffic from the content provider 13, user service provisioning, and delivery of MBMS data via the user plane interface (SGi-mb). The MBMS management module 820 also handles authorisation and initiation of MBMS bearer services and scheduling of the MBMS transmissions.

Serving Gateway/Packet Data Network Gateway (SGW/PDN-GW)

Figure 9:
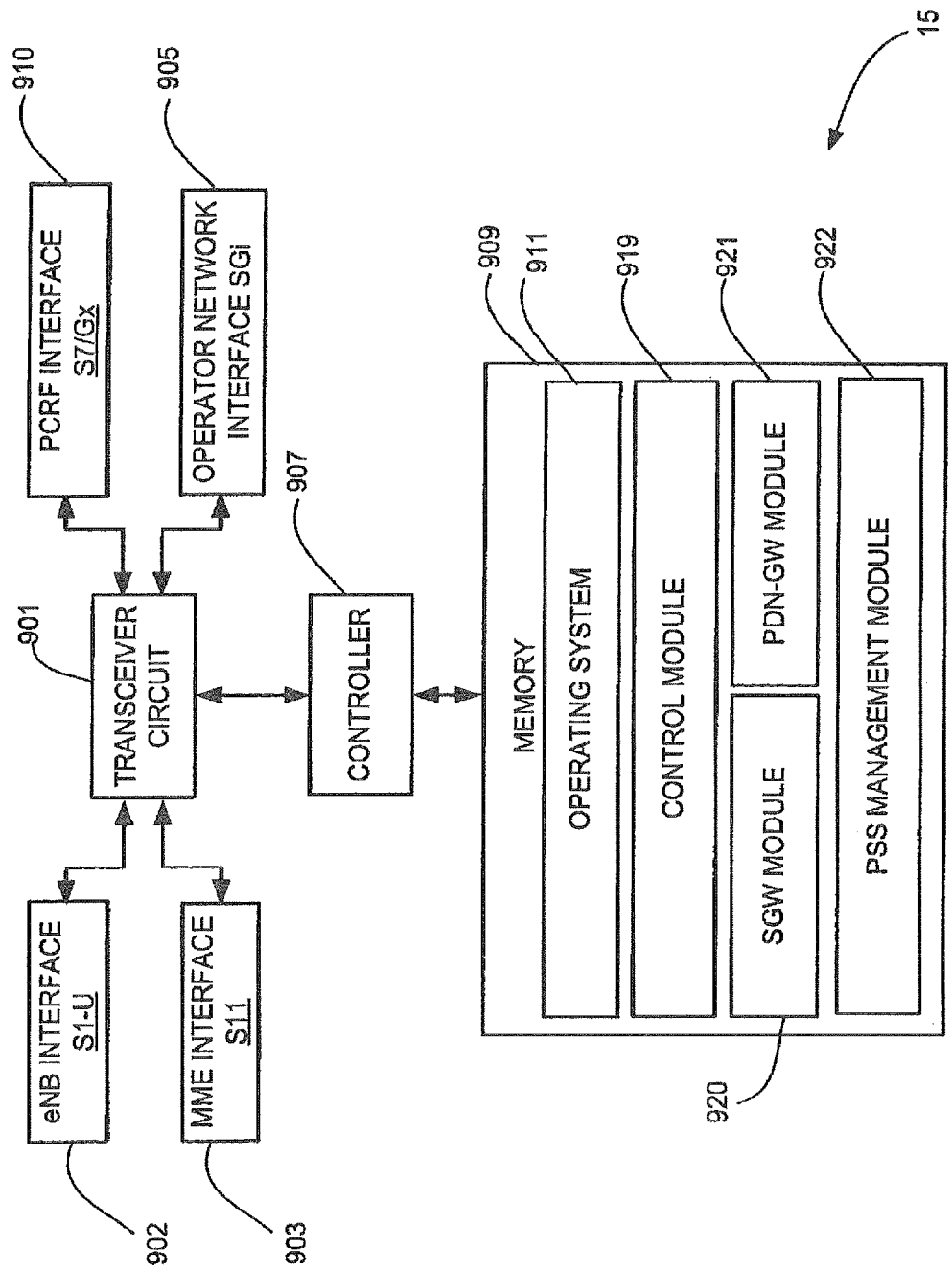
FIG. 9 is a simplified block diagram of a combined Serving Gateway/Packet Data Network Gateway (SGW/PDN-GW) forming part of the system shown in FIG. 2.

FIG. 9 shows a combined SGW/PDN-GW 15 having a transceiver circuit 901 coupled to an eNB interface 902, an MME interface 903, an operator network interface 905, and a PCRF interface 910. The various interfaces 902, 903, 905, 910 have corresponding logical interfaces (sometimes referred to as reference points) S1-U, S11, SGi, and S7/Gx as indicated in FIG. 9 in parenthesis.

A controller 907 is provided to control the transceiver circuit 901, and is coupled to a memory 909 comprising software including, among other things, an operating system 911, a communications module 919, an SGW module 920, and a PDN-GW module 921, and a PSS management module 922. The communications module 919 is operable to handle SGW related communications with the base station 5 via the eNB interface 902 and with the MME 9 via the MME interface 903. The communications module 919 is also operable to handle PDN-GW related communications with the operator network via the operator network interface 905 and with the PCRF 19 via the PCRF interface 910.

The SGW module 920 provides the functions of the serving gateway part of the SGW/PDN-GW 15 and the PDN-GW module 921 provides the functions of the PDN gateway part of the SGW/PDN-GW 15. The PSS management module manages the Packet-Switched Streaming Services functions of the SGW/PDN-GW 15 in cooperation with the SGW module 920 and the PDN-GW module 921.

MBMS Service Provision Via Unicast and/or Broadcast/Multicast—Overview

Figure 10:
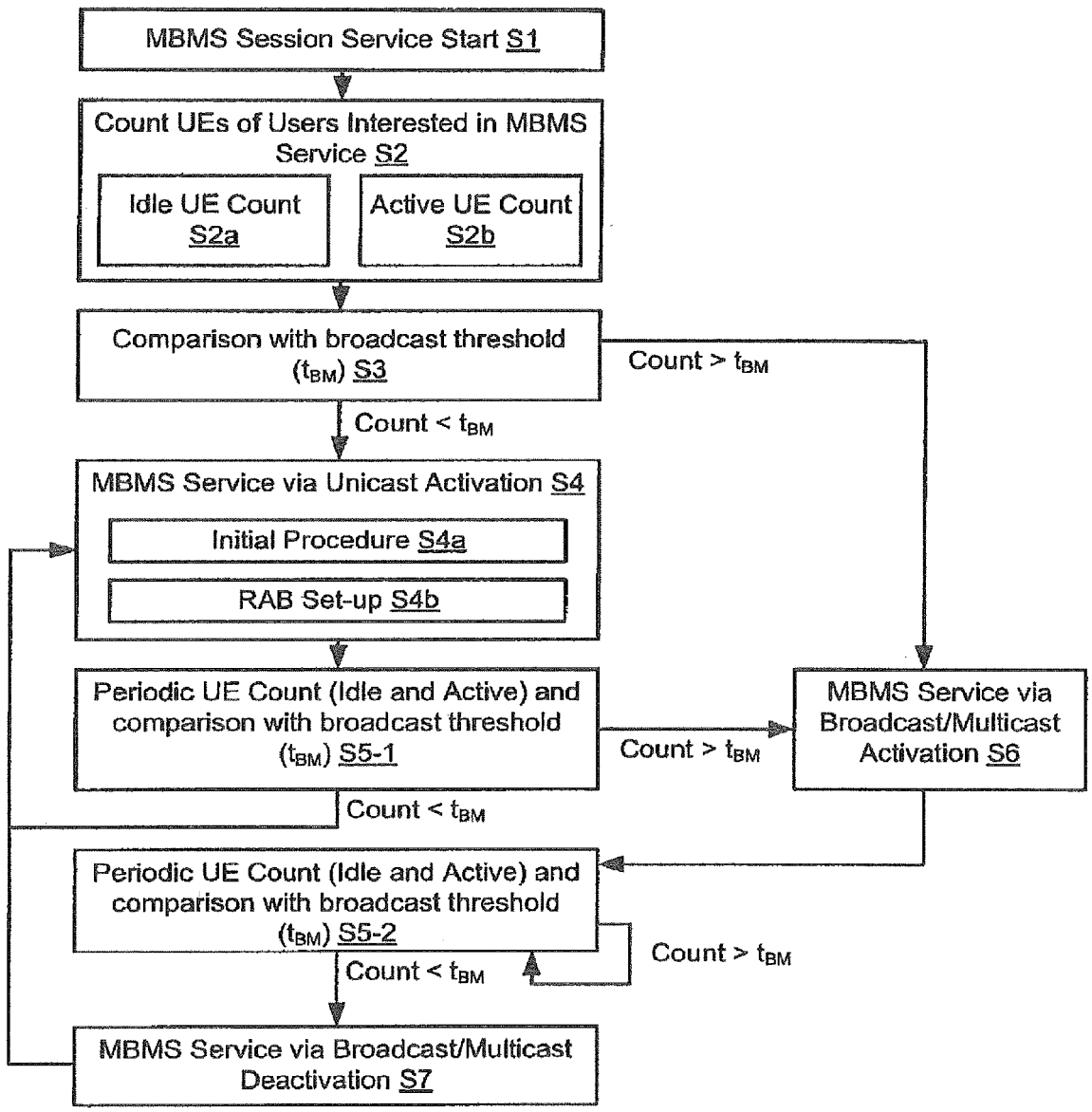
FIG. 10 is a high level flow chart illustrating a procedure implemented by the communication system 1 to selectively provide an MBMS service by unicast and/or by broadcast/multicast.

FIG. 10 is a high-level flow chart illustrating a procedure implemented by the communication system 1 to provide selectively an MBMS service by unicast and/or by broadcast/multicast in dependence on the number of mobile communication devices 3 interested in receiving that MBMS service.

As seen in FIG. 10 the procedure begins with the initiation of a new MBMS service (S1) by the BM-SC 12 requesting the start of an associated MBMS session via the MBMS-GW 10 for a particular coverage area. Before the requested MBMS session is initiated, a counting procedure is undertaken to determine the number of mobile communication devices 3 indicating an interest ('interested mobile communication devices') in receiving the requested MBMS service (S2). The counting procedure includes counting mobile communication devices 3 that are normally in idle mode (S2a) and mobile communication devices 3 that are in an active (or 'connected') mode (S2b). Once the total number of interested mobile communication devices 3 in the coverage area has been counted, the total is compared to a predetermined threshold ('$t_{BM}$') above which provision of the MBMS service via broadcast/multicast is considered to be viable (S3). If the total number of interested mobile communication devices 3 is found to be below the threshold '$t_{BM}$' then a procedure to provide the MBMS service, via unicast, to each interested mobile communication device 3 is activated (S4). Otherwise, if the total number of interested mobile communication devices 3 is found to be above the threshold '$t_{BM}$', then a procedure to provide the MBMS service via broadcast/multicast is initiated (S6).

The procedure to activate the MBMS service via unicast comprises an initial procedure (S4a) followed by a RAB setup procedure (S4b). The initial procedure (S4a) involves the MCE 7 informing the BM-SC 12, via the MME 9 and the MBMS-GW 10 that there are insufficient interested mobile communication devices 3 to warrant broadcast/multicast delivery. The RAB setup procedure (S4b) involves setup of a respective radio access bearer for delivering the MBMS service to each interested mobile communication device 3 via unicast.

After delivery via unicast or broadcast/multicast is setup, the counting and comparison procedure is periodically repeated (S5-1/S5-2) to determine if the number of interested mobile communication devices 3 in the coverage area for the MBMS service has changed significantly. When the MBMS service is being delivered via unicast and the number of interested users is determined to have increased above the threshold $t_{BM}$, delivery via broadcast/multicast is initiated (S6). Otherwise, if the number of interested users remains below the threshold $t_{BM}$, delivery of the MBMS service via unicast is maintained for each mobile communication device 3 already receiving it, and is activated for any interested mobile communication devices 3 that are not already receiving it (S4). When the MBMS service is being delivered via broadcast/multicast and the number of interested users is determined to have decreased below the threshold $t_{BM}$, delivery via broadcast/multicast is deactivated (S7) and delivery of the MBMS service via unicast is activated (S6) for each interested mobile communication devices 3 remaining in the coverage area. Otherwise, if the number of interested users remains above the threshold $t_{BM}$, delivery of the MBMS service via broadcast/multicast is maintained.

There are a number of different ways in which the various stages of the procedure of FIG. 10 may be implemented including: a network centric approach in which the network initiates the setup of each radio access bearer for the provision of the MBMS service to a respective mobile communication device using unicast communication; and a so called 'UE' centric approach in which each mobile communication device wishing to receive the MBMS service initiates the setup the radio access bearer required for the provision of the MBMS service to it via unicast communication.

The present embodiment makes use of a network centric approach which will now be described in more detail.

Network Centric Approach

FIGS. 11 to 18 illustrate, in more detail, the steps (S1 to S7) of the procedure of FIG. 10 for counting mobile communication devices, and for providing the MBMS service via unicast and/or broadcast/multicast accordingly according to the present embodiment. The procedure illustrated in FIGS. 11 to 18 is a network centric approach in which the network is responsible for initiating setup of unicast communication.

For simplicity, in FIGS. 11 to 18, the actions of the MBMS-GW and the BM-SC are combined.

(S1) MBMS Session Service Start

Figure 11:
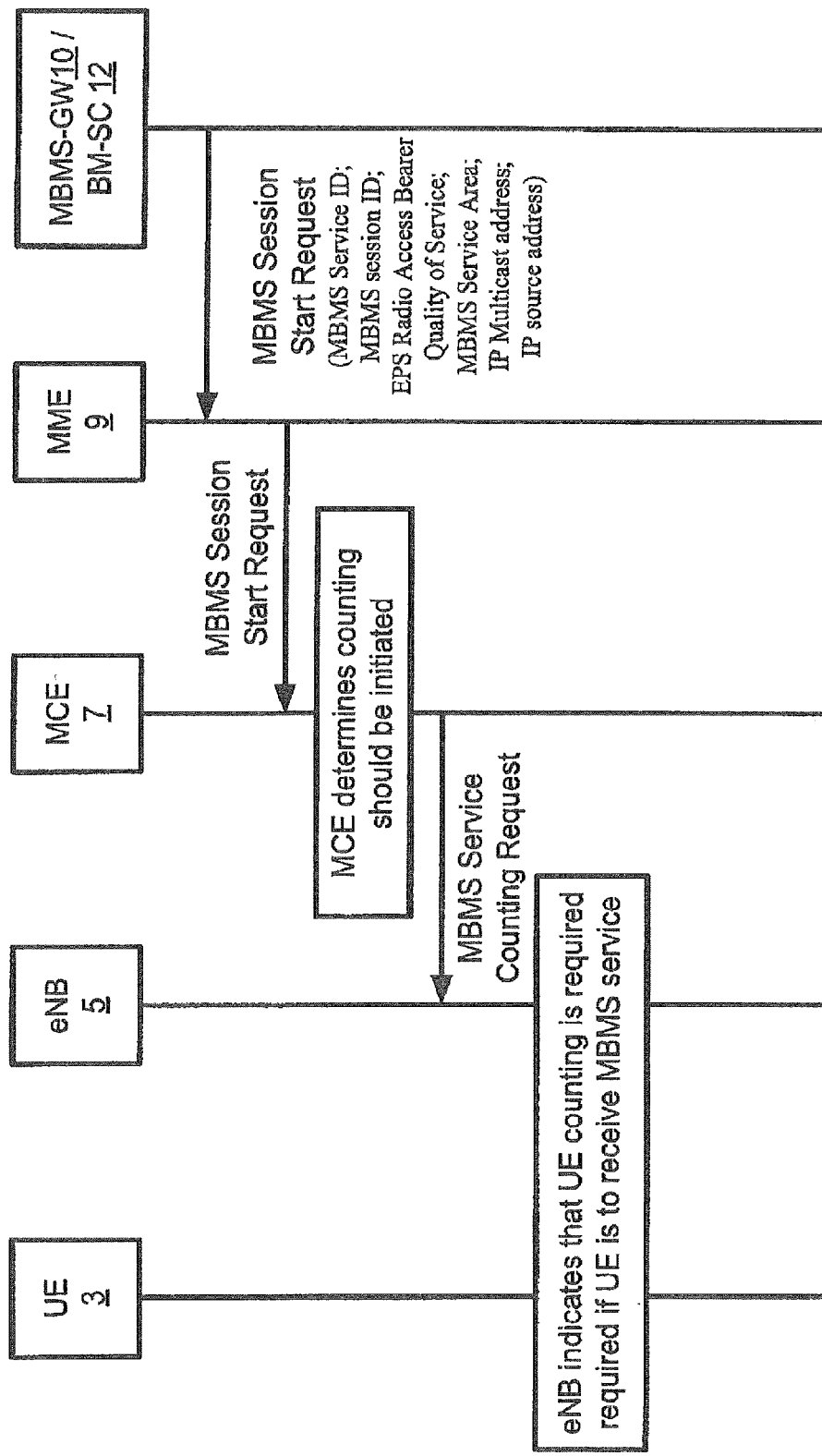
FIG. 11 is a simplified timing diagram illustrating an MBMS session service start phase of the procedure of the procedure of FIG. 10.

FIG. 11 is a simplified timing diagram illustrating the MBMS session service start phase (S1) of the procedure of FIG. 10 in more detail.

As seen in FIG. 11 the BM-SC 12 initiates an MBMS session via the MBMS-GW 10. To request initiation of the MBMS service, the MBMS-GW 10 sends an MBMS Session Start Request to the MME 9 effectively requesting initiation of a broadcast/multicast session for delivery of the MBMS service. The MBMS Session Start Request comprises information including (among other information):

an MBMS Service ID for identifying the MBMS service to which the request relates;
an MBMS session ID for identifying the MBMS session to be used to provide the MBMS service;
an Evolved Packet System (EPS) Radio Access Bearer (RAB) Quality of Service information element identifying, for example, QoS parameters such as end to end delay, bit error rates etc;
an MBMS Service Area identifier identifying the area (e.g. a cell or group of cells) in which the MBMS session is made available;
an IP Multicast address identifying the IP address from which the MBMS data is distributed; and
an IP source address.

The MBMS Session Start Request is forwarded by the MME 9 to the MCE 7. In this embodiment the forwarded MBMS Session Start Request includes information for notifying the MCE 7 that counting of the interested mobile communication devices 3 is required before delivery of the MBMS service via broadcast/multicast can be allowed. In response to the MBMS Session Start Request, therefore, the MCE 7 determines that the procedure for counting the interested mobile communication devices 3 should be initiated for the MBMS service to which the MBMS Service ID relates.

To initiate the counting procedure, the MCE 7 sends an MBMS Service Counting Request to each base station 5 in the coverage area (e.g. the MBSFN area) to inform the base station 5 that counting should commence for the identified MBMS Service. The MBMS Service Counting Request includes the identity of the MBMS Service (MBMS Service ID) and the MBMS service area (MBMS Service Area).

On receipt of the MBMS Service Counting Request each base station 5 in the coverage area indicates to the mobile communication devices 3 it serves that counting is required to receive the MBMS service. In this embodiment, the base station 5 provides this indication in System Information, which is periodically broadcast to the mobile communication devices. Thus, the mobile communication device 3 is able to determine that it is required to expressly indicate to the base station 5 that it is interested in receiving the MBMS service.

Figure 12:
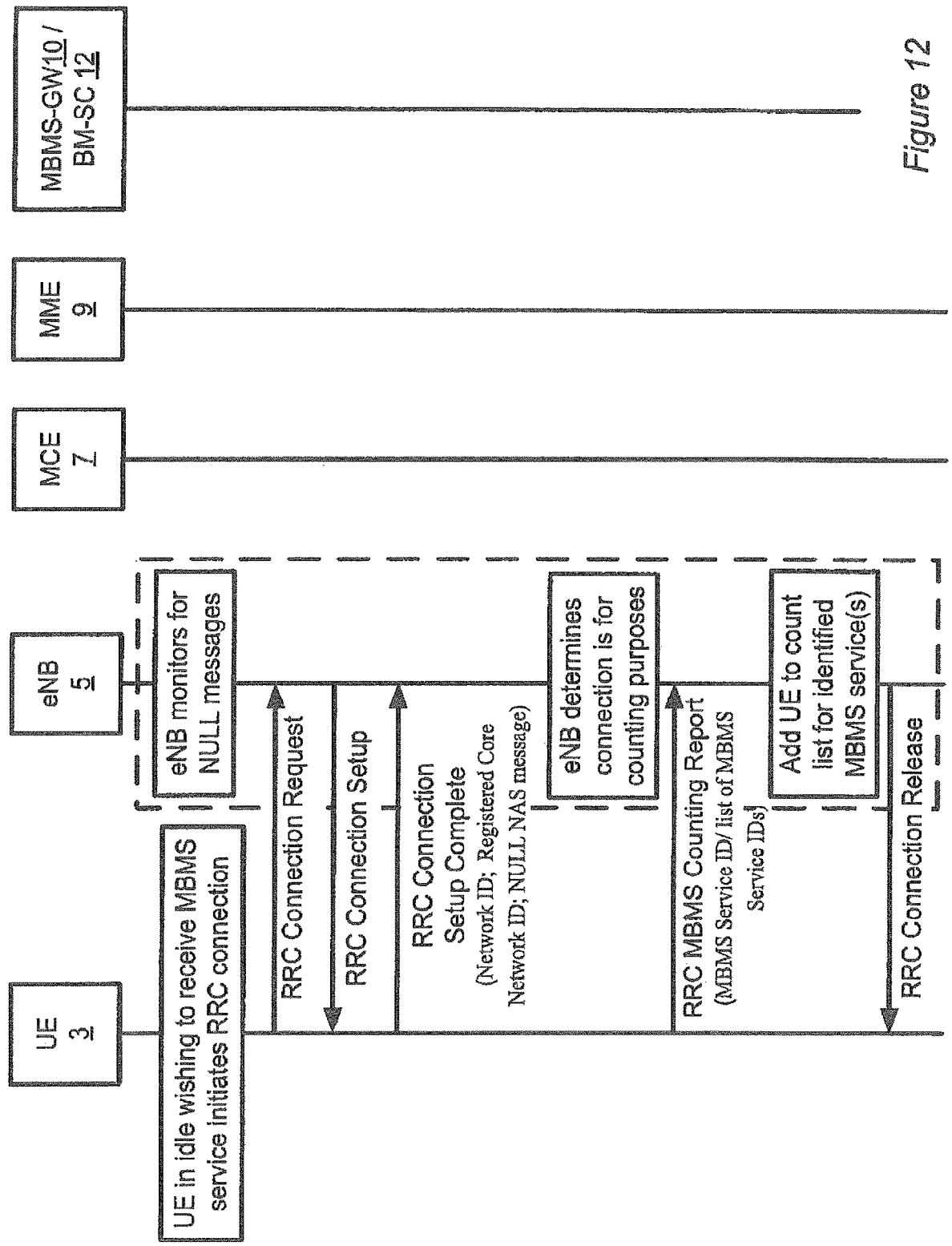
FIG. 12 is a simplified timing diagram illustrating an idle mode part of a counting phase of the procedure of FIG. 10.
Figure 13:
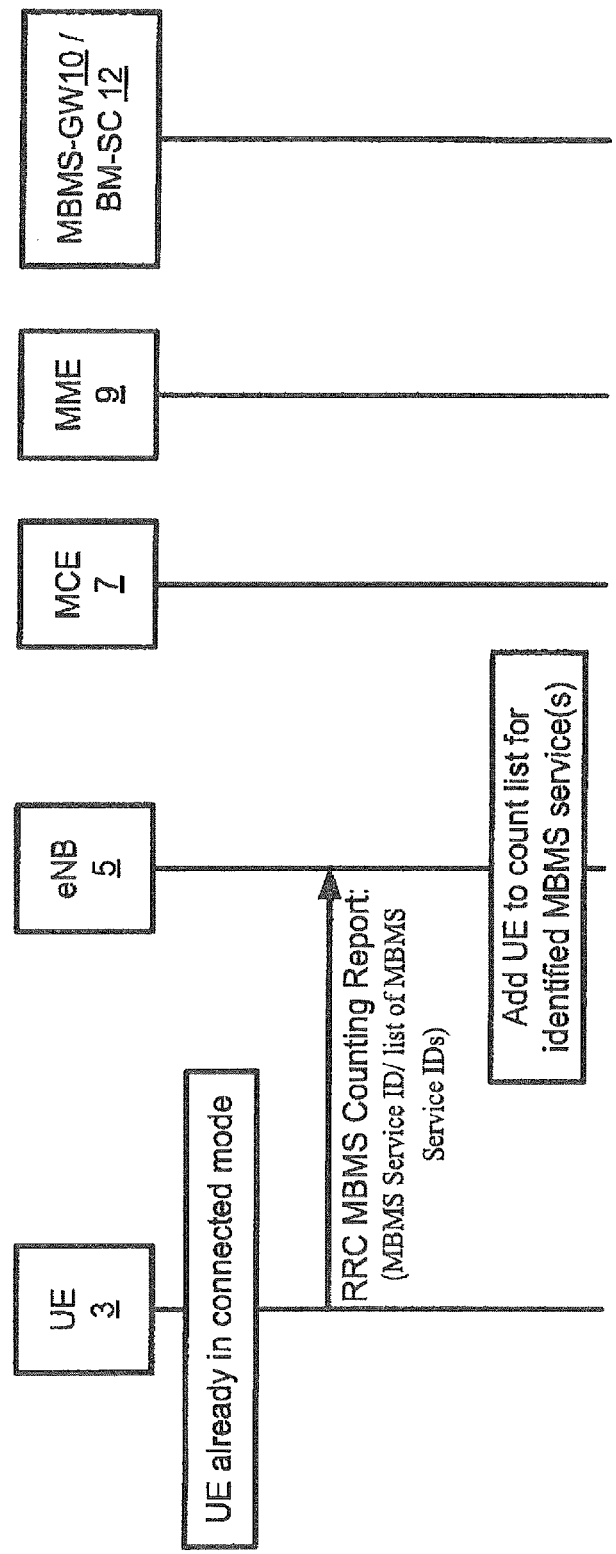
FIG. 13 is a simplified timing diagram illustrating an active mode part of a counting phase of the procedure of FIG. 10.

(S2) Count Mobile Communication Devices 'Interested' in Receiving the MBMS Service FIGS. 12 and 13 are simplified timing diagrams illustrating, in more detail, the phase of the procedure (S2) shown in FIG. 10, for counting the mobile communication devices 3 that are interested in receiving a particular MBMS Service.

Specifically, FIG. 12 illustrates the part of the procedure (S2a) for counting the mobile communication devices 3 that are in idle mode, and FIG. 13 illustrates the part of the procedure (S2b) for counting the mobile communication devices 3 that are active.

(S2a) Idle Mobile Communication Device Count

As seen in FIG. 12, in this embodiment, after the counting procedure has been initiated, when a mobile communication device 3 in idle mode is interested in receiving one or more MBMS services, the mobile communication device 3 initiates a temporary RRC connection by generating and sending an RRC Connection Request. The base station 5 responds by sending an RRC Connection Setup message to allow the mobile communication device 3 to setup the RRC connection. On setup of the connection, the mobile communication device 3 generates an RRC Connection Setup Complete message, including a Network ID and a registered core network ID, to indicate successful setup of the RRC connection and sends it to the base station 5.

However, in addition to the Network ID and a registered core network ID, the mobile communication device 3 also incorporates a NULL Non Access Stratum (NAS) message (a message in which a NAS Information Element has a length set to zero) into the RRC Connection Setup Complete message, when requesting the RRC connection establishment In parallel, after the counting procedure has been initiated by the base station 5 (in response to receipt of the MBMS Service Counting Request in phase (1)), the base station 5 begins to monitor RRC signalling, from the mobile communication devices 3 it serves, for the presence of NULL NAS messages. On receipt of a message incorporating a NULL NAS message the base station 5 determines that the mobile communication device 3 from which it has received the message has initiated the RRC connection for the purposes of the MBMS counting procedure and accordingly, in this embodiment, does not progress the connection further into the network (e.g. by generating further connection setup messages and sending them to the MME 9). In this manner this embodiment has the benefit of reducing signalling.

At this stage, the base station 5 does not yet know the identity of the MBMS Service that the mobile communication device 3 is interested in because there may be several MBMS Services for which counting is required. Accordingly, the base station 5 waits for further signalling from the mobile communication device 3.

In order to inform the base station 5 of the MBMS service for which the temporary RRC connection was initiated, the mobile communication device 3 generates a RRC MBMS Counting Report incorporating an MBMS Service ID for identifying the MBMS service which the mobile communication device 3 is interested in receiving, and sends it to the base station 5. It will be appreciated that, if the mobile communication device 3 is interested in receiving more than one MBMS service from among those for which a counting procedure is being undertaken, then the mobile communication device 3 includes all the interested MBMS services On receipt of the RRC MBMS Counting Report, the base station 5 stores information identifying the mobile communication device 3 from which it received the message, in association with the identity of MBMS service for which the mobile communication device 3 has indicated an interest. In this manner, the base station 5 compiles a 'count' list of the mobile communication devices 3 that were in the idle mode when the MBMS service was initiated, without requiring setup of a full RRC connection. The base station 5 can then release the temporary (and partial) RRC connection by sending an RRC Connection Release message to the mobile communication device 3.

(S2*b*) Active Mobile Communication Device Count

As seen in FIG. 13, after the counting procedure has been initiated, when a mobile communication device 3 in active mode is interested in receiving one or more MBMS services, the mobile communication device 3 indicates its interest in receiving a particular MBMS service by sending an RRC MBMS Counting Report incorporating the identity of that MBMS service as part of the already established RRC connection.

On receipt of the RRC MBMS Counting Report, the base station 5 stores information identifying the mobile communication device 3 from which it received the message, in association with the identity of MBMS service for which the mobile communication device 3 has indicated an interest. In this manner, the base station 5 includes mobile communication devices 3 with an active connection in the count list for that MBMS service along with any interested idle mode mobile communication devices 3. The base station 5 does not need to release the RRC connection in this case because it is in use for other purposes by the active mobile communication device 3.

(S3) Comparison with Threshold

Figure 14:
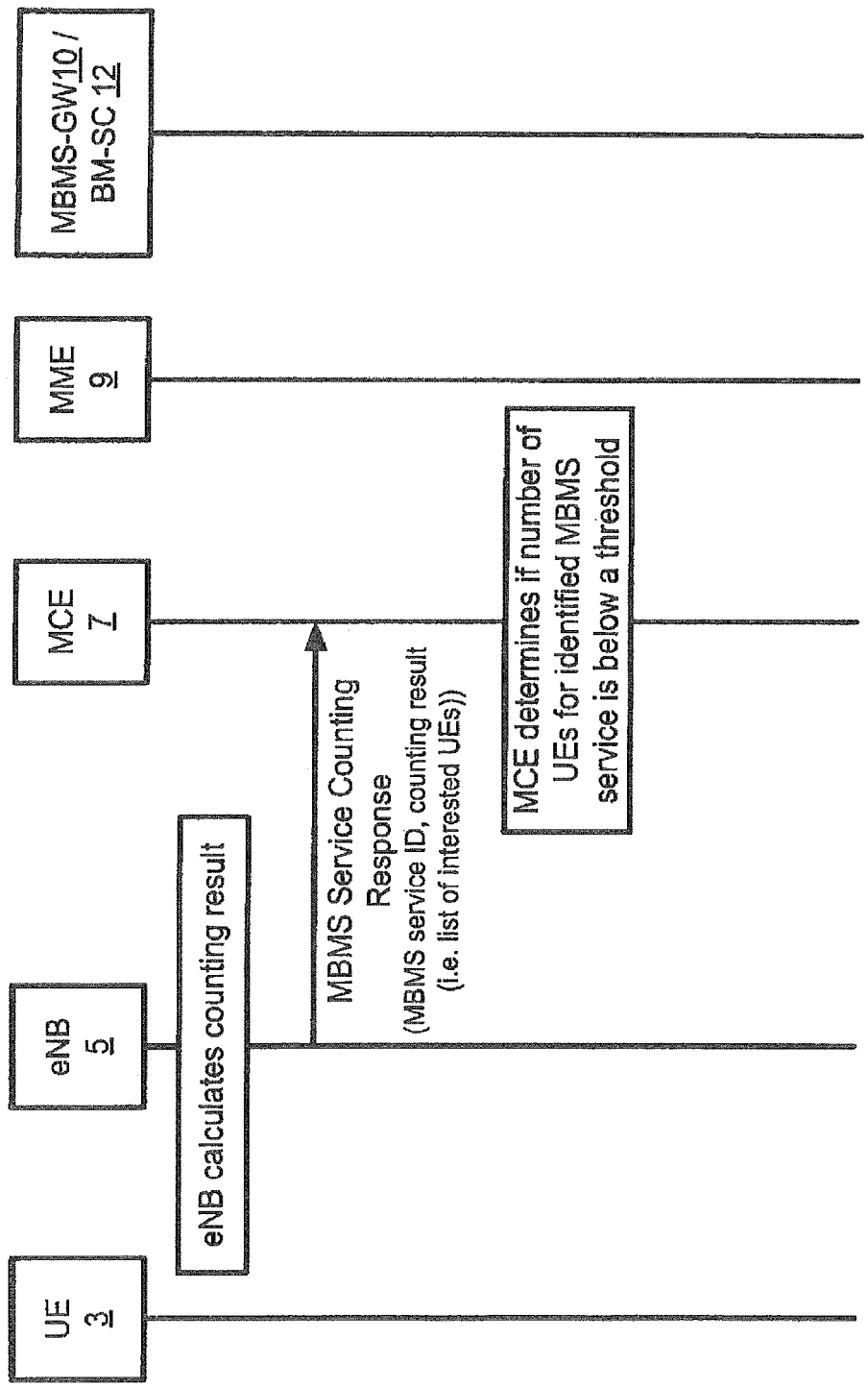
FIG. 14 is a simplified timing diagram illustrating a threshold comparison phase of the procedure of FIG. 10.

FIG. 14 is a simplified timing diagram illustrating the threshold comparison phase (S3) of the procedure of FIG. 10 in more detail.

As seen in FIG. 14, after the mobile communication devices 3 served by a base station 5 have indicate their interest in receiving an MBMS service and the base station 3 has collated the results in the count list, the base station 5 generates the resulting 'counting result' which, in this embodiment, comprises a list of identifiers for the interested mobile communication devices 3, and incorporates this into an MBMS Service Counting Response message, in association with the identity of the MBMS service (MBMS Service ID) to which the list relates, and sends the MBMS Service Counting Response message to the MCE 7.

On receipt of MBMS Service Counting Response messages from all the base stations 5 in the coverage area (e.g. MBSFN area) for the MBMS service to which the messages relate, the MCE 7 determines the total number of interested mobile communication devices 3, including both idle mode and active mobile communication devices 3, and compares the result with the predetermined broadcast threshold $t_{BM}$.

(S4) MBMS Service Via Unicast—Activation

Figure 15:
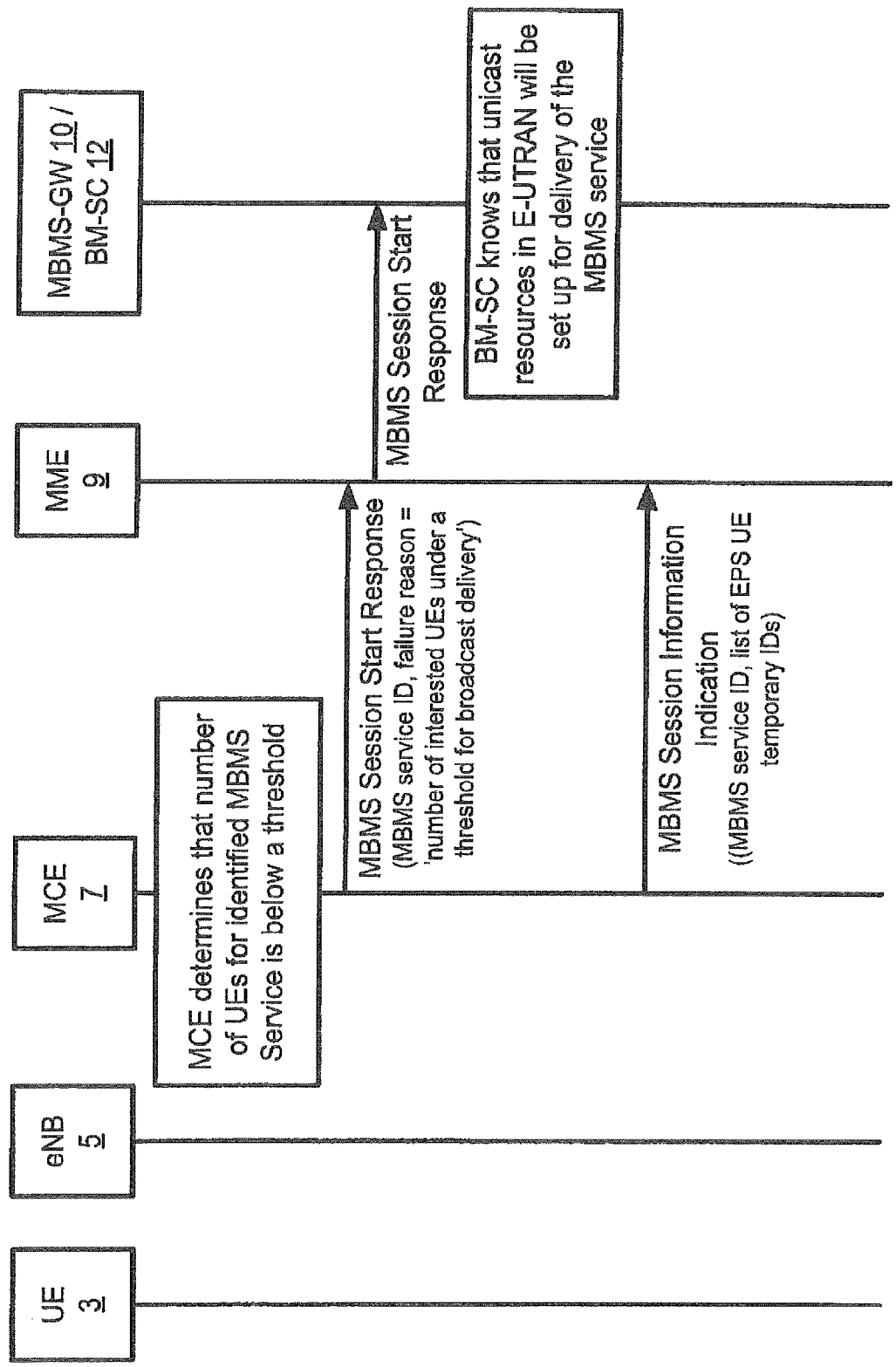
FIG. 15 is a simplified timing diagram illustrating an initial part of a unicast activation phase of the procedure of FIG. 10.
Figure 16:
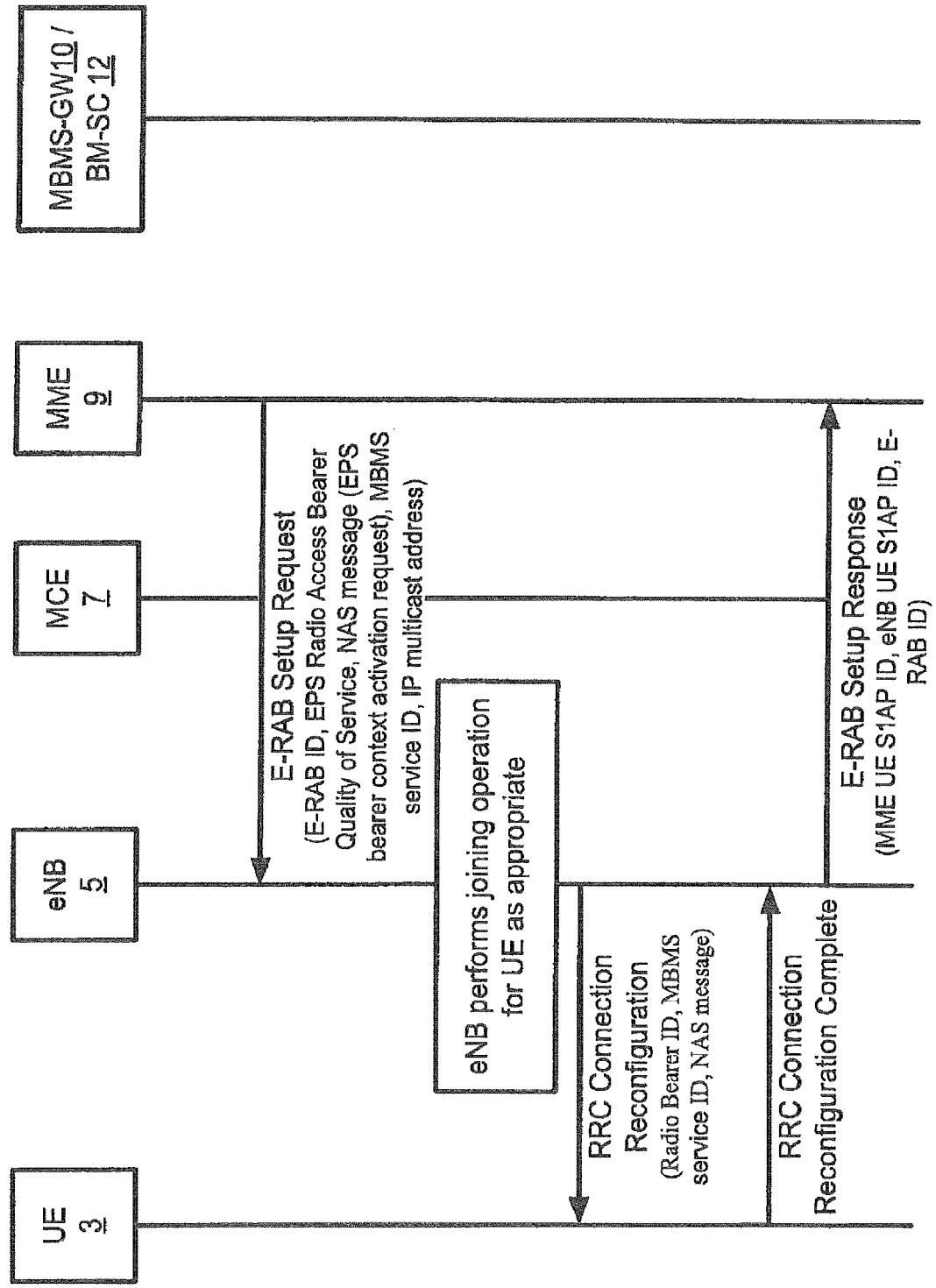
FIG. 16 is a simplified timing diagram illustrating a further part of the unicast activation phase of the procedure of FIG. 10.

FIGS. 15 and 16 are simplified timing diagrams illustrating the MBMS service via unicast activation phase (S4) of the procedure of FIG. 10 in more detail. Specifically, Figure illustrates an initial part of the unicast activation phase (S4) in which the unicast delivery is initiated, and FIG. 16 illustrates a further part of the unicast activation phase (S4) in which the radio access bearers for unicast communication are setup.

(S4*a*) Initial Procedure

As seen in FIG. 15, when the comparison performed by the MCE 7 determines that the total number of interested mobile communication devices 3, including both idle mode and active mobile communication devices 3, is less than the predetermined broadcast threshold $t_{BM}$, the MCE 7 generates a diagnostic response message and sends it to the MME 9. The diagnostic response message comprises an MBMS Session Start Response message incorporating the identity of the MBMS service to which it relates and information indicating a so called 'failure cause' to be that the 'number of interested UEs is under a threshold for broadcast delivery'.

The MME 9 forwards the MBMS Session Start Response message to MBMS-GW 10 which, in turn informs the BM-SC 12. Accordingly, the BM-SC 12 is able to establish that resources will be setup for delivering the MBMS services via unicast directly to each interested mobile communication device 3.

Further to sending the MBMS Session Start Response message indicating a failure to setup delivery using broadcast/multicast, the MCE 7 sends the list of interested mobile communication devices 3 for the MBMS service to the MME 9, so that the MME 9 can request each base station 5 to setup a radio bearer towards each interested mobile communication device 3 that the base station 5 serves. Specifically, the MCE 7 generates an MBMS Session Information Indication incorporating the identity of the MBMS service and a list of Evolved Packet System UE temporary identities (EPS UE temporary IDs) including an ED for each interested mobile communication device 3.

(S4*b*) Network Initiated RAB Setup Procedure

As seen in FIG. 16, after sending the MBMS Session Information Indication, the MME 9 triggers the setup of radio bearers for providing the unicast delivery of the MBMS service. In this embodiment, this process is initiated by sending a message requesting the setup of an E-UTRAN radio access bearer (E-RAB Setup Request) to base station 5 over the MME-S1 interface 602. The E-RAB Setup Request includes, among other things; an identifier for the E-RAB being setup (E-RAB TD); EPS Radio Access Bearer Quality of Service information; an NAS message incorporating an EPS bearer context activation request; the identity of the MBMS service (MBMS service ID); and the IP multicast address for the MBMS service.

Thanks to the presence of the IP multicast address received in the Radio Access Bearer Setup Request from the MME 9, the base station 5 is able to perform a joining operation, if appropriate (e.g. if not previously carried out for the MBMS service), for each interested mobile communication device 3. The joining operation is the process by which a particular user 'joins' (or becomes a member of) a particular multicast group, for example by the user indicating to the network that he/she wants to receive multicast mode data for a specific MBMS bearer service.

The base station 5 generates an RRC Connection Reconfiguration message incorporating an identity of the radio bearer (Radio Bearer ID), the identity of the MBMS service (MBMS service ID), and an NAS message, and sends it to the mobile communication device to initiate configuration of the radio bearer at the mobile communication device 3. Once configuration of the radio bearer is complete, the mobile communication device 3 generates an RRC Connection Reconfiguration Complete message and sends it to the base station 5 to indicate completion.

To complete the radio access bearer setup part (S4*b*) of the unicast activation procedure (S4) the base station 5 generates an E-RAB Setup Response message and sends it to the MME 9. The E-RAB Setup Response message incorporates respective identifiers for uniquely identifying the mobile communication device 3 over the S1 interface within the base station 5 and over the S1 interface within the MME 9 (MME UE S1AP ID and eNB UE S1AP ID) and the identity of the E-UTRAN radio access bearer (E-RAB ID).

(S5-1/S6) MBMS Service Via Broadcast/Multicast Activation (During Unicast Provision)

Figure 17:
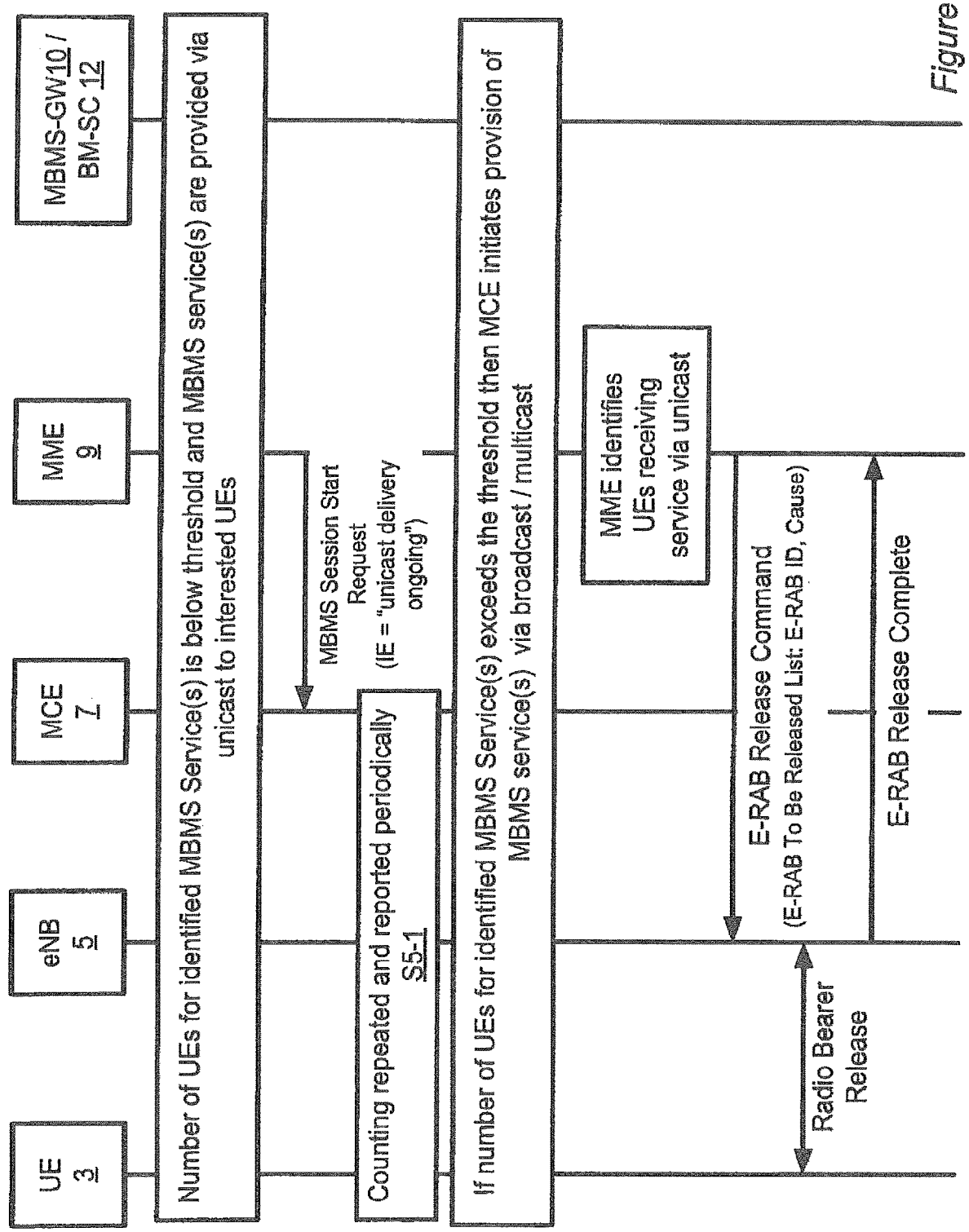
FIG. 17 is a simplified timing diagram illustrating an MBMS service via broadcast/multicast activation phase of the procedure of FIG. 10.

FIG. 17 is a simplified timing diagram illustrating the MBMS service via broadcast/multicast activation phase (S6) of the procedure of FIG. 10 in more detail following the periodic recount of the number of interested mobile communication devices 3 (both idle and active) and associated threshold comparison (S5-1). Specifically, FIG. 17 illustrates a situation in which the broadcast/multicast activation phase follows delivery of the MBMS service via unicast (e.g. the periodic recount/comparison (S5-1) has indicated that the number of interested mobile communication devices 3 (both idle and active) has risen above the broadcast threshold $t_{BM}$).

While the service is being delivered via unicast transmission, the MME 9 provides an indication to the MCE 7, so that the MCE 7 knows to perform a periodic recount of interested mobile communication devices for a given MBMS service. Specifically, an MBMS Session Start Request with a dedicated information so called "unicast delivery ongoing" can be used.

As seen in FIG. 17, when the periodic recount/comparison (S5-1) indicates that the number of interested mobile communication devices 3 has risen above the broadcast threshold $t_{BM}$, the MCE 7 initiates provision of the MBMS service via broadcast/multicast. The delivery of the MBMS service via broadcast/multicast is setup using conventional procedures (e.g. the procedures defined in the current version of the relevant 3GPP standard) which a skilled person would readily understand, and which are therefore not described in detail here.

In this embodiment, after delivery of the MBMS service via broadcast/multicast has been setup (which can be indicated to the MME 9 using a MBMS Session Start Indication including the MBMS service), the MME 9 initiates deactivation of the direct unicast delivery of the MBMS services by unicast to individual mobile communication devices 3. This is possible because, in this network centric approach, the MME 9 advantageously knows which mobile communication devices 3 have a unicast bearer for the MBMS service.

In this embodiment, the MME 9 triggers the deactivation of the direct unicast delivery of the MBMS services by generating a radio bearer release request (e.g. an E-RAB Release Command incorporating a list identifying each radio access bearer to be released) and sending it to the base station 5. In response to the radio bearer release request, the base station 5 and each affected mobile communication device 3 cooperate to release the associated MBMS delivery radio bearer, after which the base station 5 acknowledges completion by sending a completion message (E-RAB Release Complete) to the MME 9.

(S5-2/S7) MBMS Service Via Broadcast/Multicast Deactivation

Figure 18:
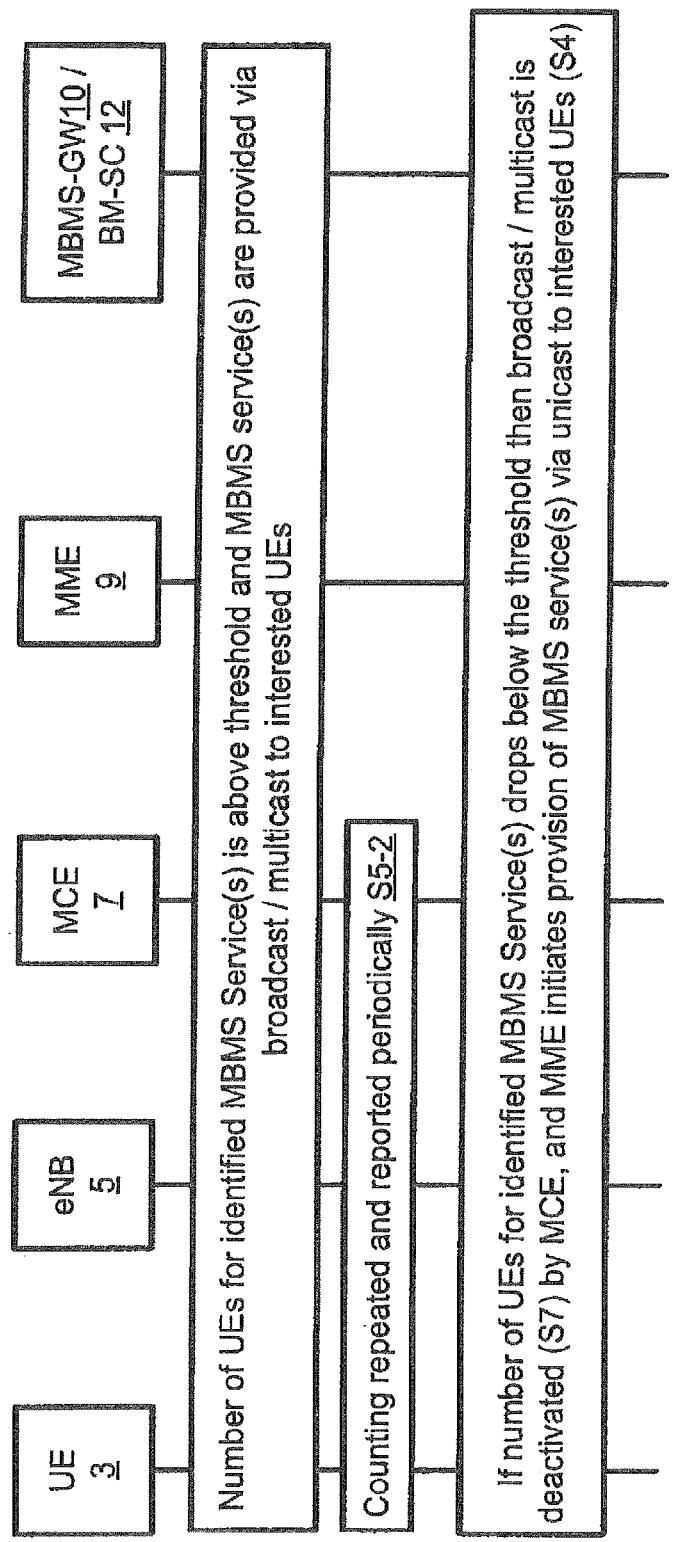
FIG. 18 is a simplified timing diagram illustrating an MBMS service via broadcast/multicast deactivation phase of the procedure of FIG. 10.

FIG. 18 is a simplified timing diagram illustrating the MBMS service via broadcast/multicast deactivation phase (S7) of the procedure of FIG. 10 in more detail following the periodic recount of the number of interested mobile communication devices 3 (both idle and active) and associated threshold comparison (S5-2). Specifically, FIG. 18 illustrates a situation in which the broadcast/multicast deactivation phase (S7) follows a periodic recount/comparison (S5-2) indicating that the number of interested mobile communication devices 3 (both idle and active) has fallen from above, to below the broadcast threshold $t_{BM}$.

As seen in FIG. 18, when the periodic recount/comparison (S5-2) indicates that the number of interested mobile communication devices 3 has fallen below the broadcast threshold $t_{BM}$, the MCE 7 initiates deactivation of the MBMS service via broadcast/multicast. The delivery of the MBMS service via broadcast/multicast is deactivated using conventional procedures (e.g. the procedures defined in the current version of the relevant 3GPP standard) which a skilled person would readily understand, and which are therefore not described in detail here.

Deactivation of delivery of the MBMS service via broadcast/multicast is indicated by the MCE 7 to MME 8 using a MBMS Session Stop Request. The MBMS Session Stop Request includes: a dedicated information element indicating the cause of the stop request to be "number of interested UEs under a threshold for broadcast delivery" and a MBMS Session Information Indication including the MBMS service ID and the list of EPS UE temporary IDs. After delivery of the MBMS service via broadcast/multicast has been deactivated, the MME 9 initiates (re)activation of the direct unicast delivery of the MBMS services by unicast to individual mobile communication devices 3 (e.g. as described above for the MBMS service via unicast activation phase (S4)).

Summary—Network Centric Approach

In summary, therefore, using the network centric approach, the MME 9 triggers the delivery of the MBMS service via unicast further to indication of relevant interested mobile communication devices 3 for each MBMS service from the MCE 7. The MCE 7 effectively informs the MME 9 when broadcast/multicast transmission of an MBMS service cannot be set up because of the low number of interested mobile communication devices 3 in some MBSFN areas of the MBMS service area. The IP multicast address and the MBMS service ID are included in the radio bearer setup request from the MME 9 to the LTE radio access network. The MBMS service ID is included in the radio bearer setup request from the LTE radio access network to the mobile communication device 3. Thus, by knowing the radio bearer that is associated with the MBMS service delivered via unicast, the MME 9 is able to trigger a release of that bearer when it is notified by the MCE 7 that the broadcast/multicast delivery of the MBMS service has been activated.

Network Centric Approach—Possible Variations

As those skilled in the art will appreciate, there are a number of possible variations that could be made to the network centric approach described above whilst still benefiting from the inventions embodied therein. A number of these will now be described, by way of example only, to illustrate the flexibility of the network approach to be adapted, depending on requirements, whilst still providing the same or similar benefits.

(S2a) Idle Mode Mobile Communication Device Counting—Variation 1

Figure 19:
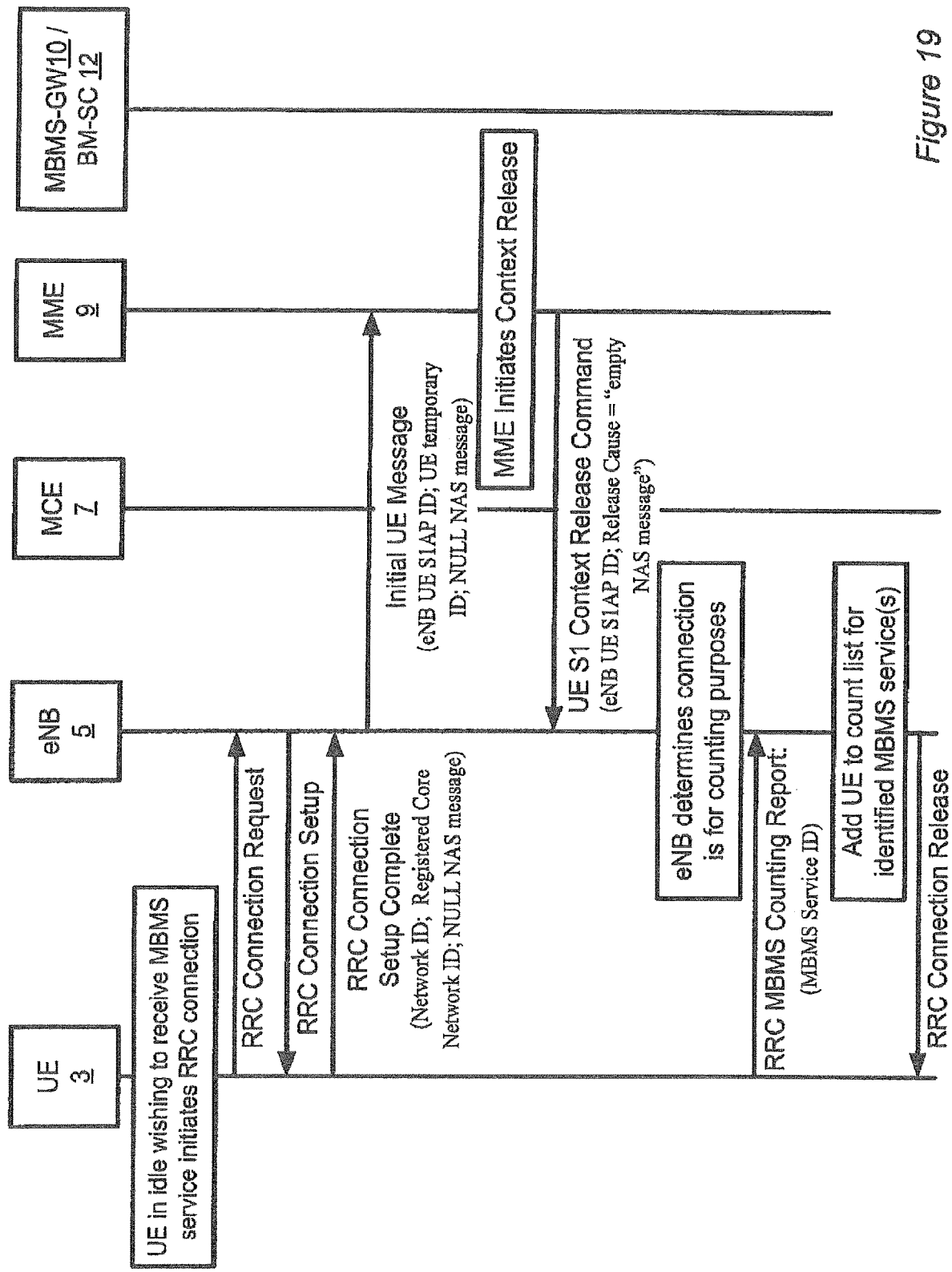
FIG. 19 is a simplified timing diagram illustrating a possible variation of the idle mode part of the counting phase of the procedure of FIG. 10.

FIG. 19 is a simplified timing diagram illustrating a first possible variation of the idle mode part (S2a) of the counting phase (S2) of FIG. 12 that might be used in a further embodiment.

As seen in FIG. 19, as described for the previous embodiment, after the counting procedure has been initiated, when a mobile communication device 3 in idle mode is interested in receiving one or more MBMS services, the mobile communication device 3 initiates a temporary RRC connection by generating and sending an RRC Connection Request. The base station 5 responds by sending an RRC Connection Setup message to allow the mobile communication device 3 to setup the RRC connection. On setup of the connection the mobile communication device 3 generates an RRC Connection Setup Complete message, including a Network ID and a registered core network ID, to indicate successful setup of the RRC connection, and sends the generated message to the base station 5.

As described for the previous embodiment, in addition to the Network ID and a registered core network ID, the mobile communication device 3 also incorporates a NULL Non Access Stratum (NAS) message (a message in which a NAS Information Element has a length set to zero) into the RRC Connection Setup Complete message, when requesting the RRC connection establishment.

Unlike the previous embodiment, however, the base station 5 does not monitor RRC signalling for the presence of NULL NAS messages. Instead, the base station treats the RRC connection as normal (according to the current 3GPP standards) by generating an Initial UE Message and sending it to the MME 9. The Initial UE Message incorporates an identifier (e.g. an application identifier) for uniquely identifying the mobile communication device 3 over S1 interface within the base station 5 (eNB UE S1 AP ID), a further 'temporary identifier' (UE temporary ID), and the NAS message. However, it will be appreciated, that unlike a conventional Initial UE Message, the NAS Message carried by the Initial UE Message in this case is a NULL NAS Message having an NAS PDU set to zero.

In response to the Initial UE Message, and more specifically the NULL NAS message carried by it, the MME 9 responds by generating, in this embodiment, a context release message (UE S1 Context Release Command) or another appropriate S1 message and sending it to the base station 5, because the MME 9 is unable to handle the NULL NAS message. The UE S1 Context Release Command incorporates an indication (a 'cause IE') that the reason for the release is the presence of the NULL NAS Message in the Initial UE Message (cause IE=NULL NAS message). On the receipt of the context release message, the base station 5 infers that the original RRC connection request was sent for the purposes of the MBMS counting procedure.

At this stage, the base station does not yet know the identity of the MBMS Service that the mobile communication device 3 is interested in because there may be several MBMS Services for which counting is required. Accordingly, the base station 5 waits for further signalling from the mobile communication device 3.

In order to inform the base station 5 of the MBMS service for which the temporary RRC connection was initiated, the mobile communication device 3 generates a RRC MBMS Counting Report incorporating an MBMS Service ID for identifying the MBMS service which the mobile communication device 3 is interested in receiving, and sends it to the base station 5.

On receipt of the RRC MBMS Counting Report, the base station 5 stores information identifying the mobile communication device 3 from which it received the message, in association with the identity of MBMS service for which the mobile communication device 3 has indicated an interest. In this manner, the base station 5 compiles a 'count' list of the mobile communication devices 3 that were in the idle mode when the MBMS service was initiated, without requiring setup of a full RRC connection. The base station 5 can then release the temporary (and partial) RRC connection by sending an RRC Connection Release message to the mobile communication device 3.

Accordingly, this embodiment has the benefit that it avoids the need for the base station to be adapted to screen RRC Connection Requests for NULL NAS messages, albeit at the expense of an increased signalling overhead.

(S2a) Idle Mode Mobile Communication Device Counting—Variation 2

Figure 20:
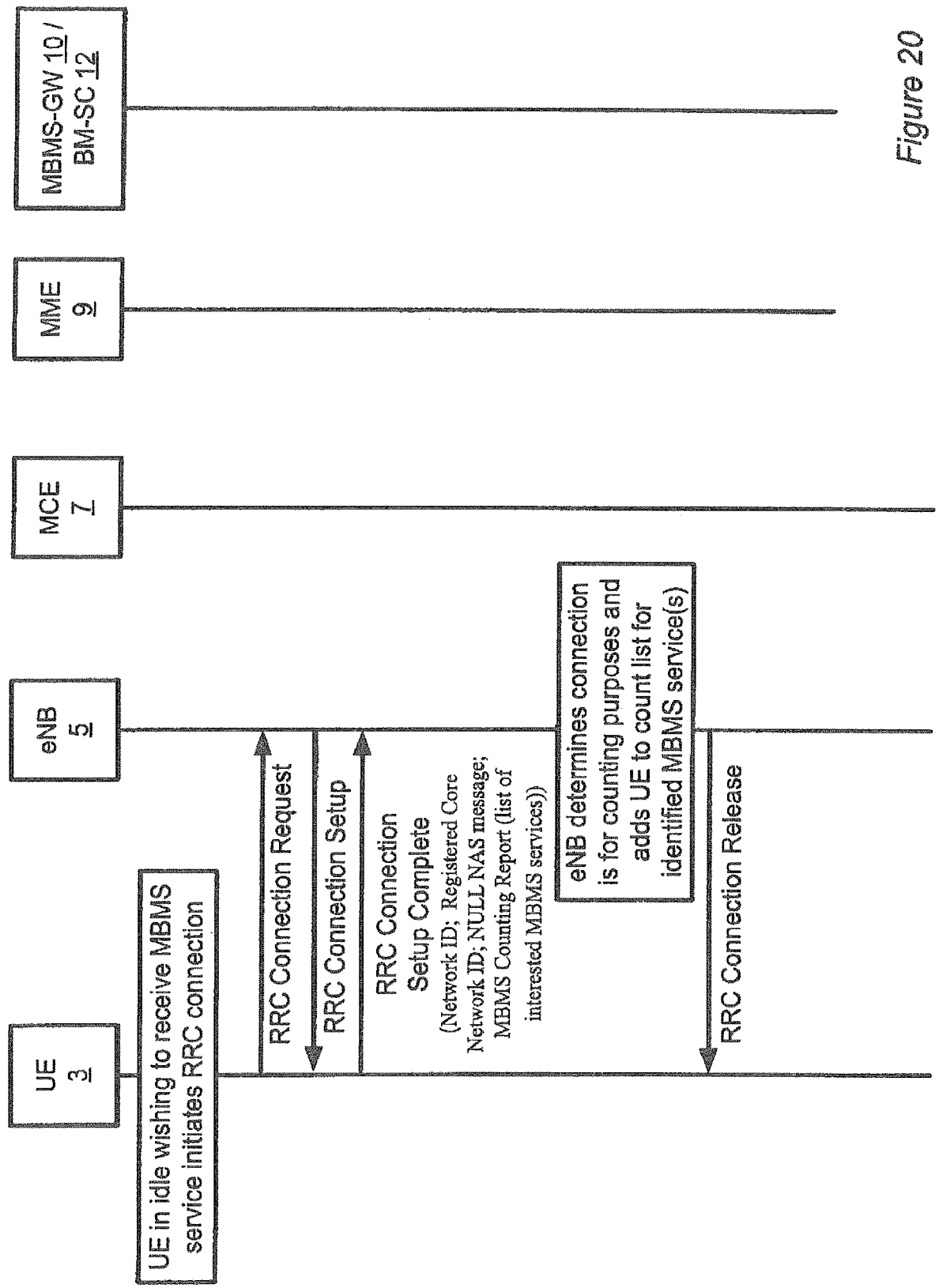
FIG. 20 is a simplified timing diagram illustrating a further possible variation of the idle mode part of the counting phase of the procedure of FIG. 10.

FIG. 20 is a simplified timing diagram illustrating another possible variation of the idle mode part (S2a) of the counting phase (S2) of FIG. 12 that might be used in a further embodiment.

As seen in FIG. 20, as described for the previous embodiments, after the counting procedure has been initiated, when a mobile communication device 3 in idle mode is interested in receiving one or more MBMS services, the mobile communication device 3 initiates a temporary RRC connection by generating and sending an RRC Connection Request. The base station 5 responds by sending an RRC Connection Setup message to allow the mobile communication device 3 to setup the RRC connection. On setup of the connection, the mobile communication device 3 generates an RRC Connection Setup Complete message, including a Network ID and a registered core network ID, to indicate successful setup of the RRC connection, and sends the generated message to the base station 5.

Like the previous embodiments, the mobile communication device 3 includes a Network ID, a registered core network ID, and a NULL Non Access Stratum (NAS) message in the RRC Connection Setup Complete message. Unlike the previous embodiments, however, the mobile communication device 3 also includes an MBMS Counting Report that incorporates an MBMS Service ID (or a list of such IDs), for identifying the MBMS service(s) that the mobile communication device 3 is interested in receiving.

On receipt of the RRC Connection Setup Complete message, the base station 5 identifies the MBMS service(s) listed in the MBMS Counting Report incorporated within the RRC Connection Setup Complete and determines that the RRC connection request was sent for the purposes of the MBMS counting procedure.

Moreover, since the base station 5 knows the identity of the MBMS Service(s) that the mobile communication device 3 is interested in, the base station 5 does not have to wait for further signalling from the mobile communication device 3. Thus, the base station 5 can store information identifying the mobile communication device 3 from which it received the message, in association with the identity of MBMS service(s) for which the mobile communication device 3 has indicated an interest. In this manner, the base station 5 compiles a 'count' list of the mobile communication devices 3 that were in the idle mode when the MBMS service was initiated, without requiring setup of a full RRC connection. The base station 5 can then release the temporary (and partial) RRC connection by sending an RRC Connection Release message to the mobile communication device 3.

Accordingly, this variation advantageously avoids the need for significant further signalling, for example, by avoiding the need to send any NAS message to the EPS core network 8.

(S4b) Network Initiated RAB Setup Procedure—Variation

Figure 21:
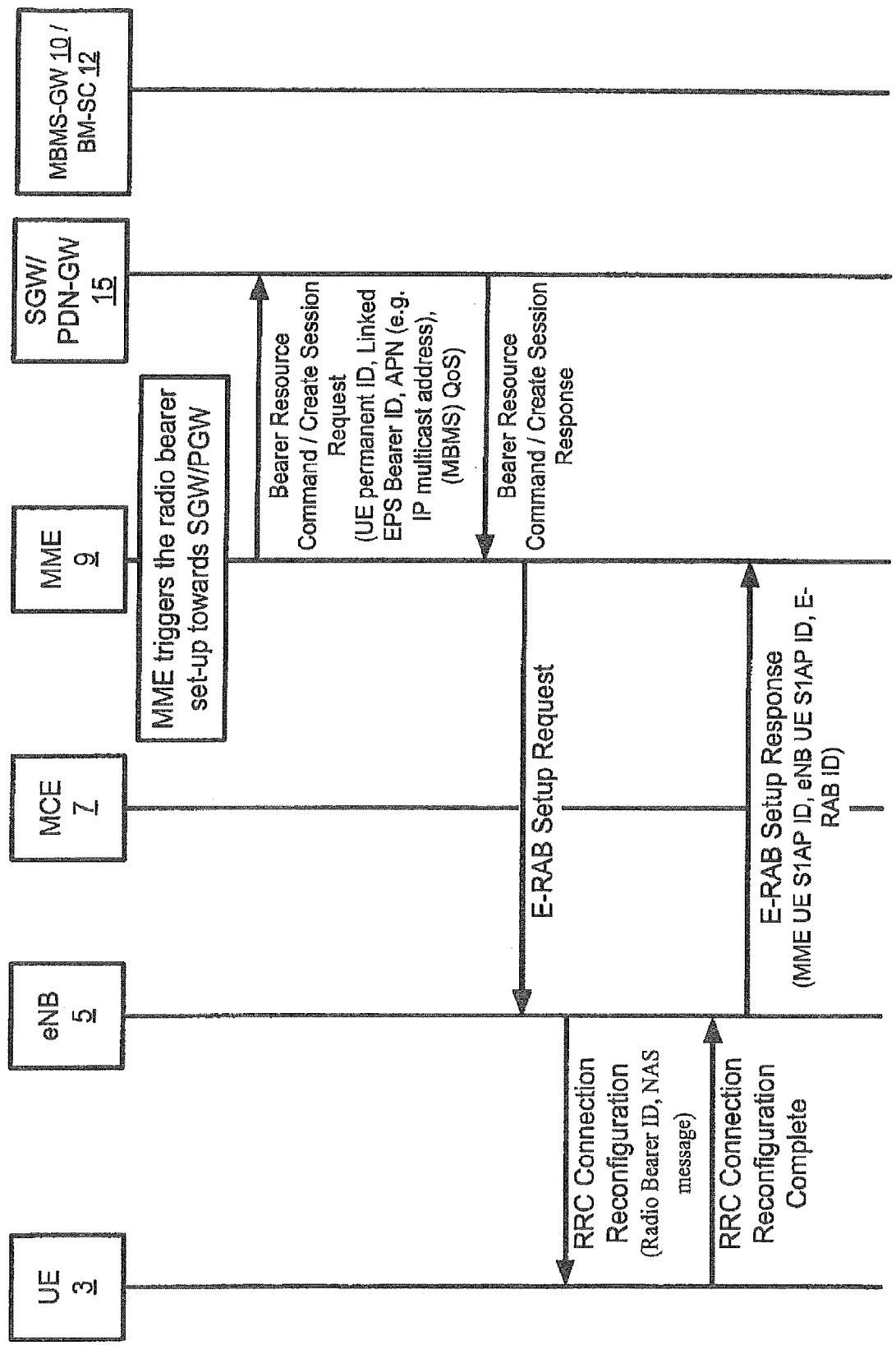
FIG. 21 is a simplified timing diagram illustrating a possible variation of the further part of the unicast activation phase of the procedure of FIG. 10.

FIG. 21 is a simplified timing diagram illustrating a possible variation of the network initialed RAB setup part (S4b) of the MBMS service via unicast activation phase (S4) of FIG. 16, which might be used in a further embodiment.

As seen in FIG. 21, like the first embodiment after sending the MBMS Session Information Indication, the MME 9 triggers the setup of radio bearers for providing the unicast delivery of the MBMS service. However, unlike the first embodiment in this variation, the process begins by generating a message for triggering bearer setup via the SGW/PDN-GW 15 (e.g. a Bearer Resource Command or Create Session Request) and sending the generated message to the SGW/PDN-GW 15. The message for triggering bearer setup incorporates appropriate information such as, for example, an identifier of the mobile communication device 3 (UE permanent ID), an identifier for the radio access bearer (Linked EPS Bearer ID), and access point identifier (APN—e.g. the IP multicast address), and/or (MBMS) Quality of Service Information.

In response to receiving the message for triggering bearer setup, the SGW/PDN-GW 15 responds by generating an associated response message for setting up the bearers for unicast procedure in accordance with a conventional PSS procedures (e.g. as defined in the relevant 3GPP standards) as would readily be understood be a skilled person. This message is then sent to the MME 9 to allow the MME 9 to co-ordinate the rest of the procedure.

The MME 9 generates and sends a message requesting the setup of an E-UTRAN radio access bearer (E-RAB Setup Request) to base station 5. The base station 5 generates an RRC Connection Reconfiguration message incorporating an identity of the radio bearer (Radio Bearer ID) and an NAS message, and sends it to the mobile communication device to initiate configuration of the radio bearer at the mobile communication device 3. Once configuration of the radio bearer is complete, the mobile communication device 3 generates an RRC Connection Reconfiguration Complete message and sends it to the base station 5 to indicate completion.

To complete the radio access bearer setup part (S4b) of the unicast activation procedure (S4) the base station 5 generates an E-RAB Setup Response message and sends it to the MME 9. The E-RAB Setup Response message incorporates respective identifiers for uniquely identifying the mobile communication device 3 over the S1 interface within the base station 5 and over the S1 interface within the MME 9 (MME UE S1AP ID and eNB UE S1AP ID) and the identity of the E-UTRAN radio access bearer (E-RAB ID).

Accordingly, in this variation, the MME 9 triggers the new Bearer Resource allocation by signalling towards the Serving/PDN Gateways 15 rather than the base station 5. This variation advantageously makes use of key features of a legacy EPS architecture to provide unicast using PSS thereby providing for improved backwards compatibility.

UE Centric Approach

Figure 22:
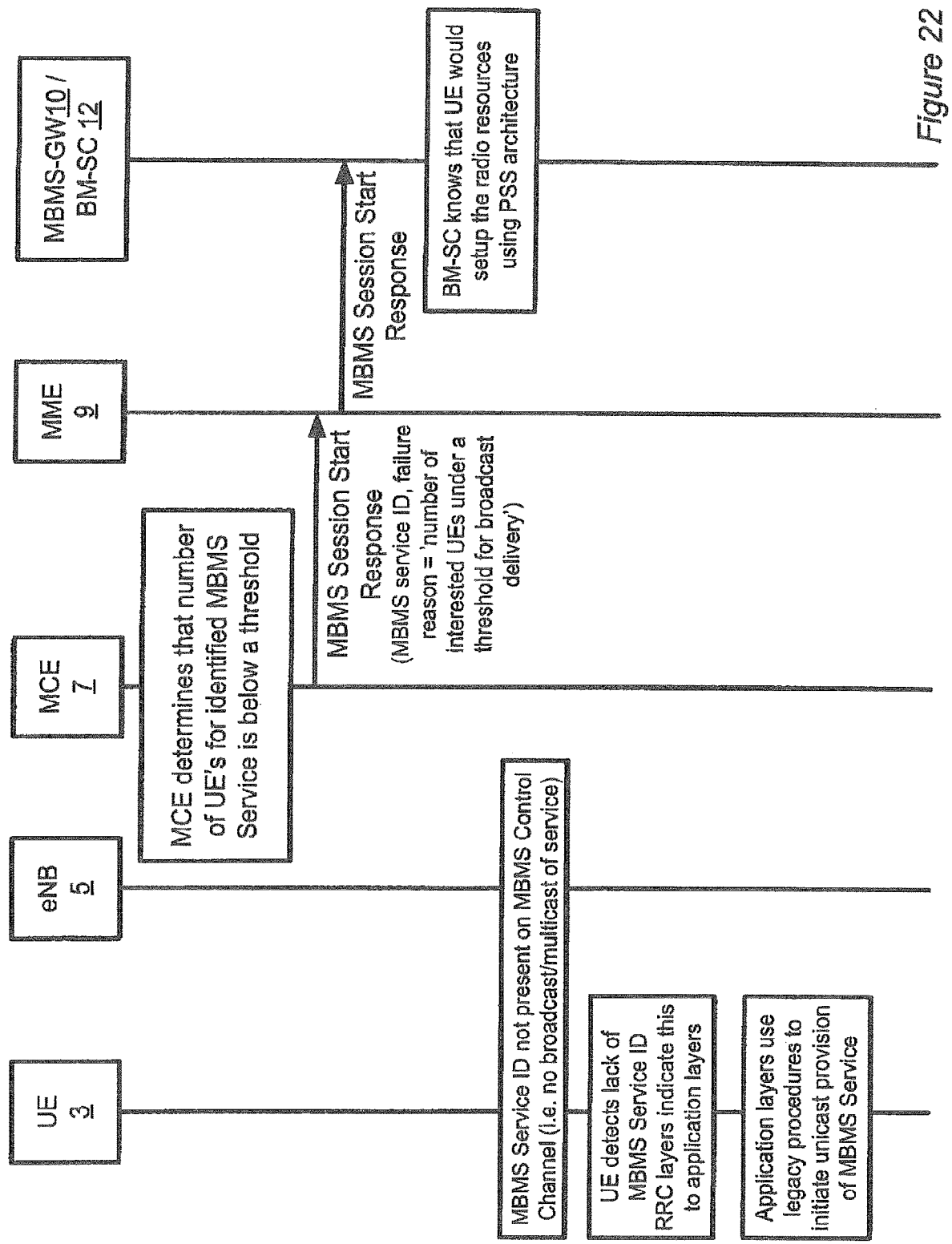
FIG. 22 is a simplified timing diagram illustrating a possible variation of a unicast activation phase of the procedure of FIG. 10.
Figure 23:
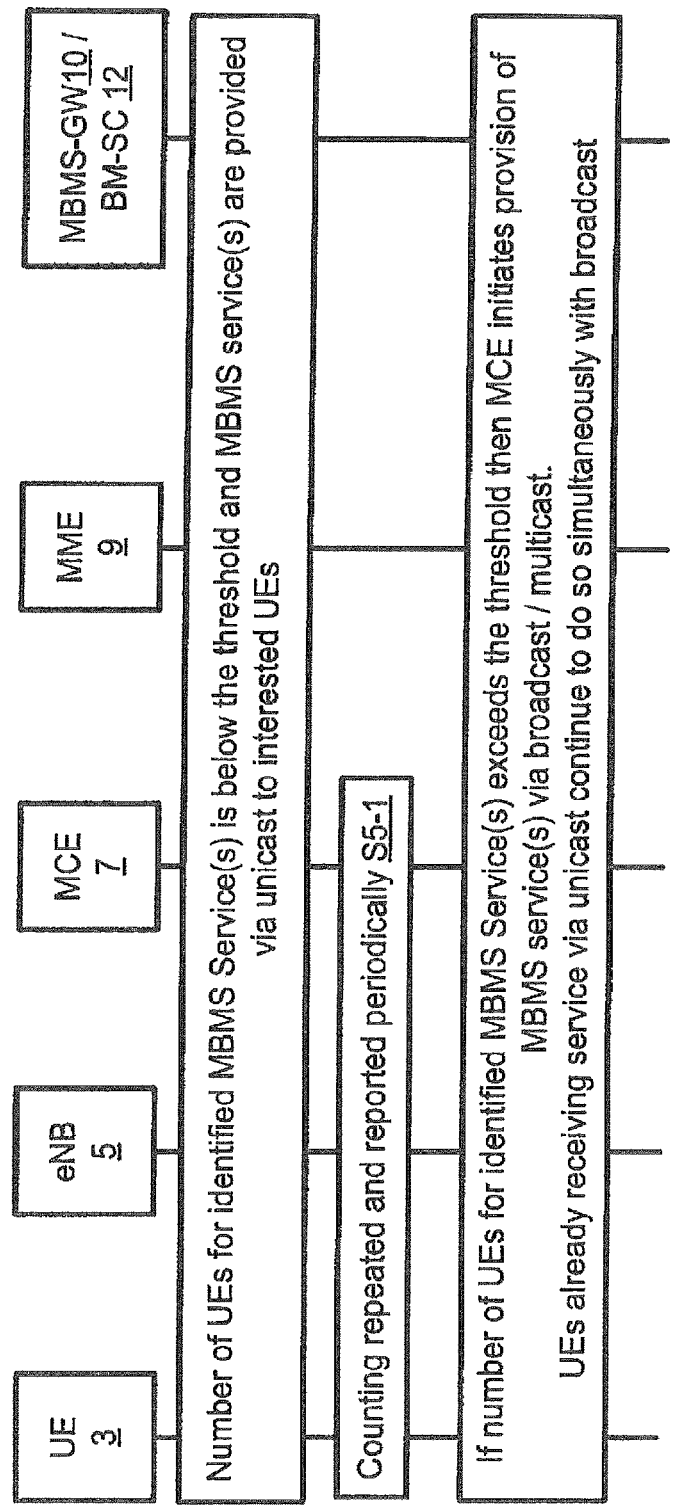
FIG. 23 is a simplified timing diagram illustrating a possible variation of a broadcast/multicast phase of the procedure of FIG. 10.

FIGS. 22 and 23 illustrate, in more detail, key steps of the procedure of FIG. 10 for counting mobile communication devices, and for providing the MBMS service via unicast and/or broadcast/multicast according to another embodiment. The procedure illustrated in FIGS. 22 and 23 is a UE centric approach in which the mobile communication device 3 is responsible for initiating setup of unicast communication.

In this embodiment, the UE centric approach, the MBMS session service start phase (S1), the counting phase (S2, S2a, S2b), and the threshold comparison phase (S3) proceed essentially as described for the first embodiment for FIGS. 11 to 14, although it will be appreciated that the variations to the counting phase may be employed in other embodiments.

In this embodiment, however, a variation on the unicast activation phase (S4) is employed.

(S4) MBMS Service Via Unicast—Activation (UE Centric Approach)

FIG. 22 is a simplified timing diagram illustrating the variation of the unicast activation phase (S4) for the UE centric approach to the implementation of the procedure in FIG. 10, in more detail.

(S4a) Initial Procedure (UE Centric Approach)

As seen in FIG. 22, when the comparison performed by the MCE 7 determines that the total number of interested mobile communication devices 3, including both idle mode and active mobile communication devices 3, is less than the predetermined broadcast threshold $t_{BM}$, the MCE 7 generates a 'failure indicating' response message and sends it to the MME 9. The diagnostic response message effectively indicates, to the MME 9, that the attempt to setup delivery of the MBMS service via broadcast/multicast has failed. The response message comprises an MBMS Session Start Response message incorporating the identity of the MBMS service to which it relates and information indicating the reason for the failure to be that the 'number of interested UEs is under a threshold for broadcast delivery'.

The MME 9 forwards the MBMS Session Start Response message to MBMS-GW 10, which in turn informs the BM-SC 12. In this embodiment, the BM-SC establishes that the resources for establishing unicast delivery of the MBMS service will be setup using the PSS architecture 1-2.

At this stage, unlike the previous embodiments, delivery of the MBMS service is not initiated by the network, instead it is initiated by each mobile communication device 3 wishing to receive the MBMS service.

(S4b) UE Initiated RAB Setup Procedure (UE Centric Approach)

Each mobile communication device 3 interested in receiving a particular MBMS service, in this embodiment, monitors for setup of MBMS service delivery via broadcast/multicast by monitoring the MBMS control channel for the corresponding MBMS service ID.

When the MBMS service is not made available, the RRC layers of the mobile communication device 3 detect the absence of the expected MBMS Service ID on the control channel, when the counting procedure has stopped, and signals the absence to the application layers.

Upon receipt of an indication from the radio layers that the MBMS Service ID is not present, the application layers in the mobile communication device 3 initiate setup of the radio bearers for unicast delivery of the service via the PSS architecture 1-2 using conventional legacy mechanisms (e.g. as described in the relevant 3GPP standards).

(S5-1/S6) MBMS Service Via Broadcast/Multicast Activation (During Unicast Provision—UE Centric Approach)

FIG. 23 is a simplified timing diagram illustrating the MBMS service via broadcast/multicast activation phase (S6) for the UE centric approach to the implementation of the procedure in FIG. 10, in more detail. The activation phase (S6) is illustrated following the periodic recount of the number of interested mobile communication devices 3 (both idle and active) and associated threshold comparison (S5-1). Specifically, FIG. 23 illustrates a situation in which the broadcast/multicast activation phase follows delivery of the MBMS service via unicast (e.g. the periodic recount/comparison (S5-1) has indicated that the number of interested mobile communication devices 3 (both idle and active) has risen above the broadcast threshold $t_{BM}$).

As seen in FIG. 23, when the periodic recount/comparison (S5-1) indicates that the number of interested mobile communication devices 3 has risen above the broadcast threshold $t_{BM}$, the MCE 7 initiates provision of the MBMS service via broadcast/multicast. The delivery of the MBMS service via broadcast/multicast is setup using conventional procedures (e.g. the procedures defined in the current version of the relevant 3GPP standard) which a skilled person would readily understand, and which are therefore not described in detail here.

Unlike the network centric approach, however, after delivery of the MBMS service via broadcast/multicast has been setup, the MME 9 does not initiate deactivation of the direct unicast delivery of the MBMS services by unicast to individual mobile communication devices 3 because the MME 9 does not know which mobile communication devices 3 have a unicast bearer set up. Accordingly, mobile communication devices 3 already receiving the MBMS service via unicast continue to do so simultaneously with delivery of the MBMS service via broadcast/multicast.

(S5-2/S7) MBMS Service Via Broadcast/Multicast Deactivation (UE Centric Approach)

When the periodic recount/comparison (S5-2) indicates that the number of interested mobile communication devices 3 has fallen below the broadcast threshold $t_{BM}$, the MCE 7 initiates deactivation of the MBMS service via broadcast/multicast. The delivery of the MBMS service via broadcast/multicast is deactivated using conventional procedures (e.g. the procedures defined in the current version of the relevant 3GPP standard) which a skilled person would readily understand.

After delivery of the MBMS service via broadcast/multicast has been deactivated, the RRC layers of the mobile communication device 3 detect the absence of the MBMS Service ID on the MBMS control channel and initiate (re)activation of unicast delivery as described above for the MBMS service via unicast activation phase (S4) according to the UE centric approach.

Summary—UE Centric Approach

In summary, therefore, in the UE centric approach, if the radio layers of the mobile communication device 3 detect that either: the counting procedure is over and delivery of the service via broadcast/multicast has not started; or a service that was previously delivered via broadcast/multicast is no longer delivered via broadcast/multicast; then an indication is provided from the radio layers to the application layers to indicate that the mobile communication device 3 should make use of legacy mechanisms to receive the service via unicast. The application layer in the mobile communication device 3 that receives the MBMS service via unicast can indicate receipt to the radio layers of the mobile communication device 3 so that the mobile communication device 3 can be counted for the MBMS services of interest. Then, when broadcast is available, the radio layers of the mobile communication device 3 indicate accordingly to the application layer, which can then deactivate delivery of the MBMS service via unicast using a NAS EPS bearer context deactivation procedure requested by the UE.

The UE centric approach provides benefits in terms of reduced impact of the implementation on the network, and provides improved backwards compatibility with legacy systems.

Other Modifications and Alternatives

A number of detailed embodiments and variations have been described above. As those skilled in the art will appreciate, a number of modifications and alternatives can be made to the above embodiments and variations whilst still benefiting from the inventions embodied therein.

It will be appreciated that although many of the logical/functional entities of the communication system architectures 1-1 and 1-2 are described as physically separate entities, two or more of the entities may be combined into a single entity. For example, if the MCE 7 is controlling one base station, the MCE 7 may be provided as part of the base station 5 in which case the M2 interface will be an internal logical interface within the base station 5. However, generally, as the MCE 7 controls more than one base station, the M2 Interface will still be visible (to the other base stations). Similarly, some or all of the functionality of a single entity may be provided as physically separate entities. For example, the SGW and PDN-GWs need not be combined and may be provided separately.

It will be appreciated that although FIG. 20 shows a NULL Non Access Stratum (NAS) message being incorporated into the RRC Connection Setup Complete message the NAS message need not be a NULL message but may be modified to any suitable value because the presence of the MBMS services list is sufficient to indicate that the initiation of the active connection is for the purposes of counting.

It will be appreciated that although in the above embodiments the information identifying the number of interested mobile communication devices is advantageously provided as a list of information identifying each interested device. The information may be provided as a value (e.g. a cumulative total) representing the number of interested mobile communication devices counted in the counting procedure.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

It will be appreciated that whilst, in the above embodiments information is provided in the MBMS Session Start Request for letting the MCE 7 know that counting of interested mobile communication devices 3 is required before deciding to deliver an MBMS service using broadcast/multicast transmission, the information could be provided by other means. For example, the information could be provided in advance, by the network operator, using OAM (Operation, Administration and Maintenance) signalling to pre-configure the MCE 7 to perform counting for all or specific MBMS services. Moreover, it will be appreciated that the indication, to the mobile communication devices 3, that counting for a particular MBMS service is required may be provided to each mobile communication device 3 via dedicated Radio Resource Control (RRC) signalling from the base station 5 that serves it.

In the embodiments described above, the various entities illustrated in FIGS. 3 to 9 are described as having each including transceiver circuitry. Typically, this circuitry will be formed by dedicated hardware circuits. However, in some embodiments, part of the transceiver circuitry may be implemented as software ran by the corresponding controller.

In the above embodiments, a number of software modules were described. As those skilled in the art will appreciate, the software modules may be provided in compiled or un-compiled form and may be supplied to any of the various entities illustrated in FIGS. 3 to 9, as a signal over a computer network, or on a recording medium. Further, the functionality performed by part or all of this software may be performed using one or more dedicated hardware circuits. However, the use of software modules is preferred as it facilitates the updating of the various entities in order to update their functionalities.

Various other modifications will be apparent to those skilled in the art and will not be described in further detail here.

This application is based upon and claims the benefit of priority from United Kingdom patent application No. 1018855.5, filed on Nov. 8, 2010, the disclosure of which is incorporated herein in its entirety by reference

The invention claimed is:

1. A method performed by a mobile communication device configured to support one or more multicast and broadcast services, the method comprising:
   receiving, from a base station of a network providing the one or more multicast and broadcast services, system information related to the one or more multicast and broadcast services;
   transmitting, to the base station, in a case including upon radio resource control (RRC) connection establishment with the network, an RRC message comprising interest information indicating at least one service of the one or more multicast and broadcast services, identified by the system information, which the mobile communication device is interested in receiving; and
   receiving, based on the interest information, from the base station, an RRC Reconfiguration message to allow the mobile communication device to receive the at least one service which the mobile communication device is interested in receiving.

2. The method according to claim 1, wherein the interest information is used to release a radio bearer for the at least one service of the one or more multicast and broadcast services.

3. The method according to claim 1, wherein the RRC message is a dedicated message for the one or more multicast and broadcast services.

4. The method according to claim 1, wherein the RRC Reconfiguration message comprises an identity of the at least one service.

5. A mobile communication device configured to support one or more multicast and broadcast services, the mobile communication device comprising:
   a transceiver; and
   a controller, wherein the controller is configured to:
   control the transceiver to receive, from a base station of a network providing the one or more multicast and broadcast services, system information related to the one or more multicast and broadcast services information;
   control the transceiver to transmit, to the base station, in a case including upon radio resource control (RRC) connection establishment with the network, an RRC message comprising interest information indicating at least one service of the one or more multicast and broadcast services, identified by the system information, which the mobile communication device is interested in receiving; and
   control the transceiver to receive, based on the interest information, from the base station, an RRC Reconfiguration message to allow the mobile communication device to receive the at least one service which the mobile communication device is interested in receiving.

6. The mobile communication device according to claim 5, wherein the interest information is used to release a radio bearer for the at least one service of the one or more multicast and broadcast services.

7. The mobile communication device according to claim 5, wherein the RRC message is a dedicated message for the one or more multicast and broadcast services.

8. The mobile communication device according to claim 5, wherein the RRC Reconfiguration message comprises an identity of the at least one service.

9. A method performed by a base station configured to support one or more multicast and broadcast services in a network, the method comprising:
   transmitting, to a mobile communication device, system information related to the one or more multicast and broadcast services;
   receiving, from the mobile communication device, in a case including upon radio resource control (RRC) connection establishment with the network, an RRC message comprising interest information indicating at least one service of the one or more multicast and broadcast services, identified by the system information, which the mobile communication device is interested in receiving; and
   transmitting, based on the interest information, to the mobile communication device, an RRC Reconfiguration message to allow the mobile communication device to receive the at least one service which the mobile communication device is interested in receiving.

10. The method according to claim 9, wherein the interest information is used to release a radio bearer for the at least one service of the one or more multicast and broadcast services.

11. The method according to claim 9, wherein the RRC message is a dedicated message for the one or more multicast and broadcast services.

12. The method according to claim 9, wherein the RRC Reconfiguration message comprises an identity of the at least one service.

13. A base station configured to support one or more multicast and broadcast services in a network, the base station comprising:
- a transceiver; and
- a controller, wherein the controller is configured to:
  - control the transceiver to transmit, to a mobile communication device, system information related to the one or more multicast and broadcast services;
  - control the transceiver to receive, from the mobile communication device, in a case including upon radio resource control (RRC) connection establishment with the network, an RRC message comprising interest information indicating at least one service of the one or more multicast and broadcast services, identified by the system information, which the mobile communication device is interested in receiving; and
  - control the transceiver to transmit, based on the interest information, to the mobile communication device, an RRC Reconfiguration message to allow the mobile communication device to receive the at least one service which the mobile communication device is interested in receiving.

14. The base station according to claim 13, wherein the interest information is used to release a radio bearer for the at least one service of the one or more multicast and broadcast services.

15. The base station according to claim 13, wherein the RRC message is a dedicated message for the one or more multicast and broadcast services.

16. The base station according to claim 13, wherein the RRC Reconfiguration message comprises an identity of the at least one service.

* * * * *